United States Patent
Hayford

(10) Patent No.: US 12,041,649 B2
(45) Date of Patent: Jul. 16, 2024

(54) SYSTEMS AND METHODS TO AUTOMATE PRIORITIZING AND ORGANIZING OF CONSUMER GOODS AND SERVICES

(71) Applicant: MUSTWANTS INC., St. Augustine, FL (US)

(72) Inventor: Scott Hayford, Cedar Point, NC (US)

(73) Assignee: MUSTWANTS INC., St. Augustine, FL (US)

(*) Notice: Subject to any disclaimer, the term of this patent is extended or adjusted under 35 U.S.C. 154(b) by 413 days.

(21) Appl. No.: 17/242,792

(22) Filed: Apr. 28, 2021

(65) Prior Publication Data
US 2021/0345347 A1    Nov. 4, 2021

Related U.S. Application Data

(60) Provisional application No. 63/017,073, filed on Apr. 29, 2020.

(51) Int. Cl.
*H04W 72/06* (2009.01)
*G06Q 10/087* (2023.01)
*H04W 64/00* (2009.01)
*H04W 72/563* (2023.01)

(52) U.S. Cl.
CPC ........ *H04W 72/563* (2023.01); *G06Q 10/087* (2013.01); *H04W 64/003* (2013.01)

(58) Field of Classification Search
CPC . H04W 64/003; H04W 72/563; G06Q 10/087
USPC ......................................................... 370/329
See application file for complete search history.

(56) References Cited

U.S. PATENT DOCUMENTS

| | | | | |
|---|---|---|---|---|
| 1,049,667 A | * | 1/1913 | Burton | C10G 9/14 208/100 |
| 2013/0198696 A1 | * | 8/2013 | Wang | G06F 30/398 716/54 |
| 2014/0358943 A1 | * | 12/2014 | Raymond | G06Q 10/10 707/748 |
| 2016/0027051 A1 | * | 1/2016 | Gross | G06V 20/20 705/14.54 |

OTHER PUBLICATIONS

ISR/WO received in corresponding International Application No. PCT/US2021/029615, dated Aug. 11, 2021.

* cited by examiner

*Primary Examiner* — Christopher M Crutchfield
*Assistant Examiner* — Jean F Voltaire
(74) *Attorney, Agent, or Firm* — PATENT PORTFOLIO BUILDERS PLLC

(57) ABSTRACT

According to an embodiment, an automated prioritization and organization system is described which aides in identifying and defining personal preferences by using specific attributes indicated by the user, and optionally fused with user defined collaborators' preferences, weighted by additional intrinsic data selected by the user to generate lists of prioritized products and/or services.

17 Claims, 38 Drawing Sheets

SYSTEMS AND METHODS TO AUTOMATE PRIORITIZING AND ORGANIZING OF CONSUMER GOODS AND SERVICES

RELATED APPLICATION

This application claims priority from, and incorporates by reference, U.S. Provisional Patent Application No. 63/017,073, entitled "Systems and Methods to Automate Prioritizing and Organizing of Consumer Goods and Services", filed on Apr. 29, 2020.

TECHNICAL FIELD

Some embodiments of the subject matter disclosed herein generally relate to methods and systems for automated prioritization and organization of goods and services which aids in identifying and defining personal preferences by using specific attributes indicated by the user, optionally fused with user defined collaborators' preferences, weighted by additional intrinsic data selected by the user to generate lists of prioritized products and/or services.

BACKGROUND

In many cases online purchasers of goods and services are overwhelmed with the vast number of choices of goods and services that they are interested in purchasing, or even just learning about. Compounding that problem is the fact that there are no standardized ways to portray information about goods and services that are available and, therefore, different vendors portray similar (or even the same) goods and services quite differently. In some cases, goods and services are desired to be purchased locally and thus geo-location of a user's cellphone (or similar device) can become part of the process of searching for goods and services. Accordingly, the following discussion will begin with a discussion of geo-location, and then return to the challenges of organizing and prioritizing data sets associated with desired goods and services.

Accurately determining the geographic position of a mobile user within a wireless communication network is an ongoing challenge in wireless telecommunications development. Government mandates, such as the E-911 positioning requirements in North America, and commercial Location Based Services (LBS) demand rapid and accurate position determination for user equipment (UE). Determining a location of user equipment is frequently referred to as "positioning" in the radiocommunication art. The accurate positioning of a UE becomes more challenging when considering indoor scenarios where, for example, Assisted GPS signals are less detectable.

Several position determination methods, of varying accuracy and complexity, are known in the art. These include cell ID positioning, Round Trip Timing (RTT) positioning, Observed Time Difference of Arrival (OTDOA) positioning, Assisted Global Positioning System (A-GPS) positioning, and fingerprinting positioning. Some of these positioning techniques will now be described in more detail.

For example, Assisted GPS (A-GPS) positioning is an enhancement of the global positioning system (GPS), an exemplary architecture 100 of which is illustrated in FIG. 1. Local GPS reference receiver networks/Global reference receiver networks collect assistance data from GPS satellites, such as ephemeris data. The assistance data, when transmitted to GPS receivers in UEs connected to the cellular communication system, enhance the performance of the UE GPS receivers. Typically, A-GPS accuracy can become as good as plus or minus ten meters without differential operation. However, this accuracy becomes worse in dense urban areas and indoors, where the sensitivity of the GPS receivers in UEs is most often not high enough for detection of the relatively weak signals which are transmitted from the GPS satellites.

Regardless of which technology is used to locate a user's mobile device, the resulting location information is available for commercial and government usage. For example, various location tracking applications ("apps") are currently available to source a device's location to other apps, e.g., location tracking apps such as Google Latitude, Find My Friends, Nearby and Pathshare. Such location tracking apps return, e.g., the longitude, latitude and, optionally, a confidence indicator (indicating a likelihood that a device is actually within a certain area around the identified coordinates) to other apps which then use that location information in various ways. For example, local mobile search apps can use this location data to enable users to search for businesses, events, and products which are near to their current location.

An example of such a local mobile search app is Around Me. As shown in FIGS. 2(*a*)-2(*d*), the Around Me app provides a tool for users to locate local service and product providers. Once the Around Me app is launched, the user can allow the app to use his or her current location. Using this location, a user can search the area around his or her locale for a range of things, from hospitals to movie theaters, and retail stores to bars and restaurants, using a list based interface 200 displayed on a user's mobile device, an example of which is shown in FIG. 2(*a*). Tapping on a category in the Around Me app's interface 200, e.g., "Bars" 202, returns a list of places within that category which are local to the user's current location, e.g., list 204 shown in FIG. 2(*b*).

From the list interface 204 shown in FIG. 2(*b*), a user can find even more information about a particular establishment by tapping on a corresponding entry. For example, by tapping on the "White Horse Tavern" entry 206, the app can generate another user interface screen 208 as shown in FIG. 2(*c*). Therein, the establishment's address and phone number are available, as are capabilities to share the information using various social media outlets, to show a route between the user's current location and the establishment and to add the establishment as a favorite. Returning to FIG. 2(*b*), the user also has the option of viewing the list of entries in a map view by tapping on map button 210. This results in the app displaying a map view 212 shown in FIG. 2(*d*). Therein, each of the list entries from FIG. 2(*b*) is represented by a pin on the map 212. Tapping one of these pins brings up their details as represented by balloon box 214 in FIG. 2(*d*).

Apps like Around Me provide users with valuable information about their local product and service providers, which takes advantage of location data which is available from today's networks to inform a user of businesses and services that are available in his or her current location area. However, such apps are also relatively static in nature, e.g., providing static information about a business-like business address and phone number, and they also typically provide little more information than that which is available from web-based services like Google Maps. Moreover, even the static information presented by such apps can be unreliable since the business owners aren't involved in updating the information and because it is difficult for the individual or company which maintains the local mobile search app to continuously and rigorously update a very large database of static local business information.

In addition to the location of the goods or services, users or purchasers may consider multiple other criteria when gathering and organizing information to be used to decide on the purchase of a good or service. Such criteria can include actual features of the product, colors, design, attributes, sizes, location, distances, shapes, amenities, local attributes, lifestyle preferences and many other criteria as defined by the purchaser. Additional aspects include emotion, feelings, preferences and other facts tied to partners, spouses, children, relatives. The challenge for the purchaser to apply these criteria to a purchasing decision making process is, in many cases, related to the sellers of the relevant goods or services who market their goods or services using methods that obscure aspects of the goods or services or create so many options as to create a confusing market.

The amount of information available to purchasers online is vast and largely unorganized, and the types of inputs, outputs and tools that are available to organize purchasing data varies wildly from application to application. For example, users can favorite informational items in some applications, in other applications users can identify and save informational items for later selection, and still other applications allow user provision of or review of feedback associated with items that are available for purchase. Additional features in some applications allow sellers or agents to advise the user of the application based on preferences indicated by the user and the prioritization of the good or service being sought by the user.

Accordingly, it would be desirable to create location-based systems, devices, methods and software applications which overcome these and other drawbacks and problems.

SUMMARY

According to an embodiment, an automated prioritization and organization system is described which aides in identifying and defining personal preferences by using specific attributes indicated by the user, and optionally fused with user defined collaborators' preferences, weighted by additional intrinsic data selected by the user to generate lists of prioritized products and/or services.

According to an embodiment, a method for generating a prioritized list of relevant items associated with a good or a service includes onboarding a plurality of preference criteria associated with the good or service, wherein each preference criteria indicates at least one degree of importance that the user assigns to a corresponding attribute of the good or service; storing the plurality of preference criteria; searching for electronic records for the relevant items associated with the good or service using the stored plurality of preference criteria; determining a score for each corresponding attribute for each of the relevant items using the electronic records; and generating the prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score; wherein the composite score of each relevant item is used to determine where each relevant item is ranked in the prioritized list.

According to another embodiment, a radiocommunication system includes: a first wireless communication device including a first interface for entering information associated with a plurality of preference criteria associated with the good or service, wherein each preference criteria indicates at least one degree of importance that the user assigns to a corresponding attribute of the good or service; a central server configured to store and process plurality of preference criteria and to search for electronic records for relevant items associated with the good or service using the stored plurality of preference criteria; wherein the central server also determines a score for each corresponding attribute for each of the relevant items using the electronic records, and generates the prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score; wherein the composite score of each relevant item is used to determine where each relevant item is ranked in the prioritized list; and wherein the central server sends the prioritized list to the first wireless communication device for display thereon.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As mentioned above, when implementing, for example, location-based services in radiocommunication systems, it would be desirable to make the information provided to client users both more relevant and more organized. In order to provide appropriate prioritization and organization for the users/purchasers, the methods and systems presented below are designed to permit the gathering of data by the users, sellers and/or agents, process the data, store the processed data in a cloud architecture, and score or rank the processed data based on multiple factors indicated by the user, seller, agent and/or other collaborators presented in a format to permit the user with a more informed and organized method for making a decision on the good or service to purchase.

Figure 3:
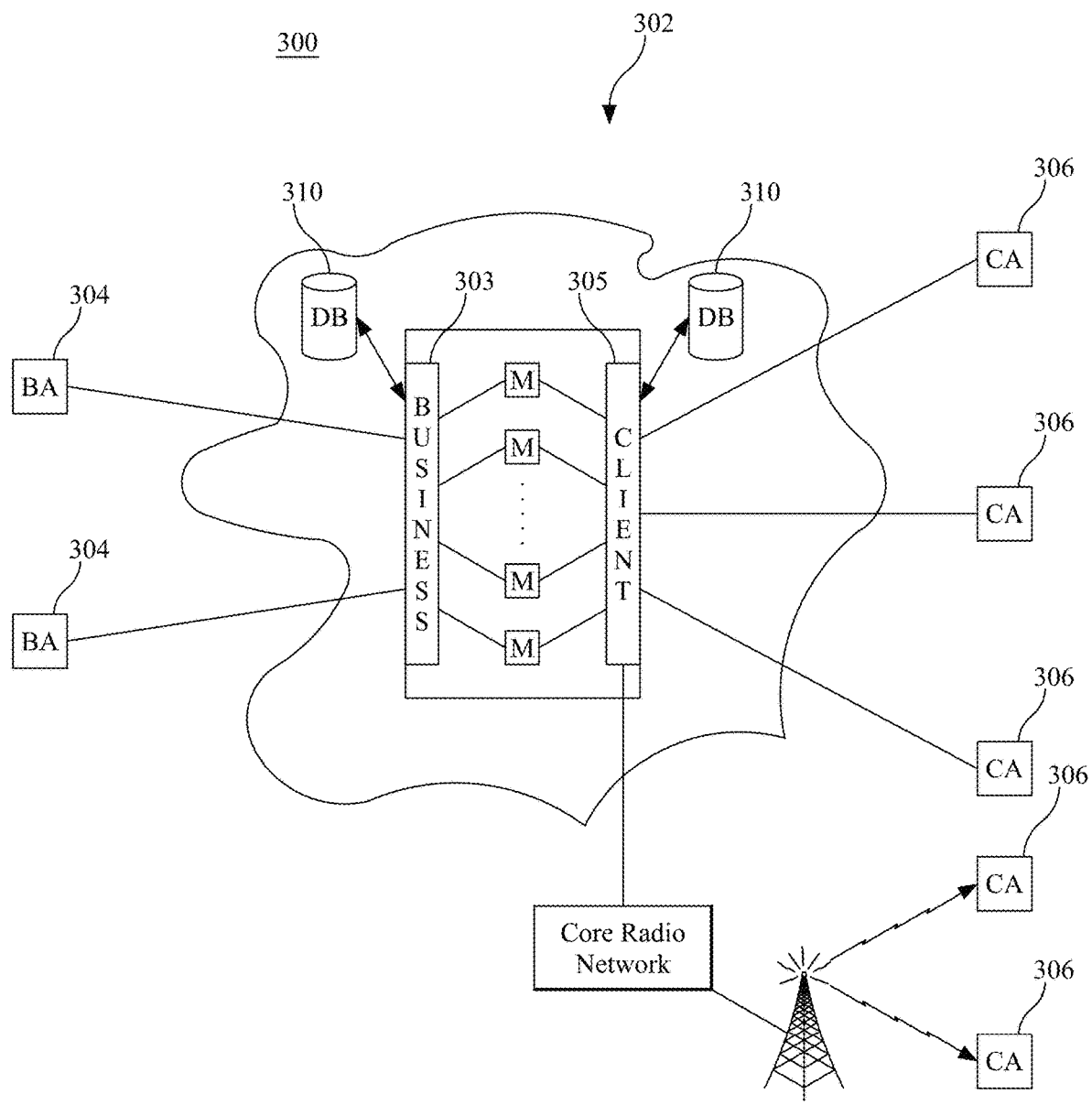
FIG. 3 illustrates a prioritization and organization system for goods and services according to a generalized embodiment.

According to an embodiment, one combination of technical features used to realize these types of location-based services is generally illustrated in FIG. 3. More specifically, FIG. 3 illustrates a system 300 according to an embodiment which enables information about products and services to be processed and disseminated to users via their client applications ("apps").

Central to the system 300 is a cloud-based central server 302 which provides an interface 303 toward businesses, represented by computer devices 304 and having a business app (BA) running thereon, as well as a client interface 305 toward users, represented in FIG. 3 by mobile devices 306 having client apps (CA) running thereon. An example of one CA according to an embodiment is described in detail with respect to FIGS. 5A-5U and 6A-6E below. In this context "businesses", can be any type of organization, e.g., commercial, non-profit, religious, public service or even potentially individuals who either generate and provide information associated with the products and services of interest or who receive information about the users interests with regard to their products and services, or both. According to some embodiments, the BA 304 and CA 306 can be a combined application with both business and client capabilities, while according to other embodiments they can be architected as separate apps. Herein, the reference numeral 306 is used alternatively in this Detailed Description to refer to the user of the system, the user's client/mobile device, the client app or both the client device and the client app as will be appreciated by the context of the relevant portion of the description and, similarly, the reference numeral 304 is used to refer to the business user, the business computing device, the business app or both.

Also shown in FIG. 3 are various modules (M) which support the features and functions associated with the business and client apps and which will be described in more detail below. Note, however, that some of the modules M interact with both the business interface 303 and the client interface 304, e.g., in support of functions where certain data and signaling is provided from a business app 304 to one or more client apps 306 or vice versa, whereas other modules interact with only one of the business interface 303 and client interface 304, e.g., in support of functions which do not involve the transfer of information from the business side to the client side, or vice versa. In certain circumstances, and according to some embodiments, the system 300 is designed to prevent businesses from acquiring information regarding a user 306's location (and other personal information of the users) so as to safeguard users' privacy. As can be seen in FIG. 3, connections between the cloud server 302 and the client devices 306 can involve either wireline and/or wireless connections (and the same holds for the business devices 304 as well).

The functions provided by modules M (which can be implemented as a combination of hardware and software to be described in more detail below) are intended, at a high level, to provide both constraints and incentives towards both the business side and the client side of the system 300. For example, as regards the business side of the system 300, one of the modules M enables the business apps 304 to upload product and/or service information which will be displayed on one or more client apps 306 when certain conditions are met. Examples of such displayed information are provided below. Another module M is responsible to enforce a time limit associated with the uploaded product/service information, essentially operating as an expiration time/date for the uploaded information. In this way, system 300 enhances the likely reliability of the content of the product and/or service information, making it significantly more likely that the product or service represented by the uploaded information is still available for sale at the stated price.

Figure 4:
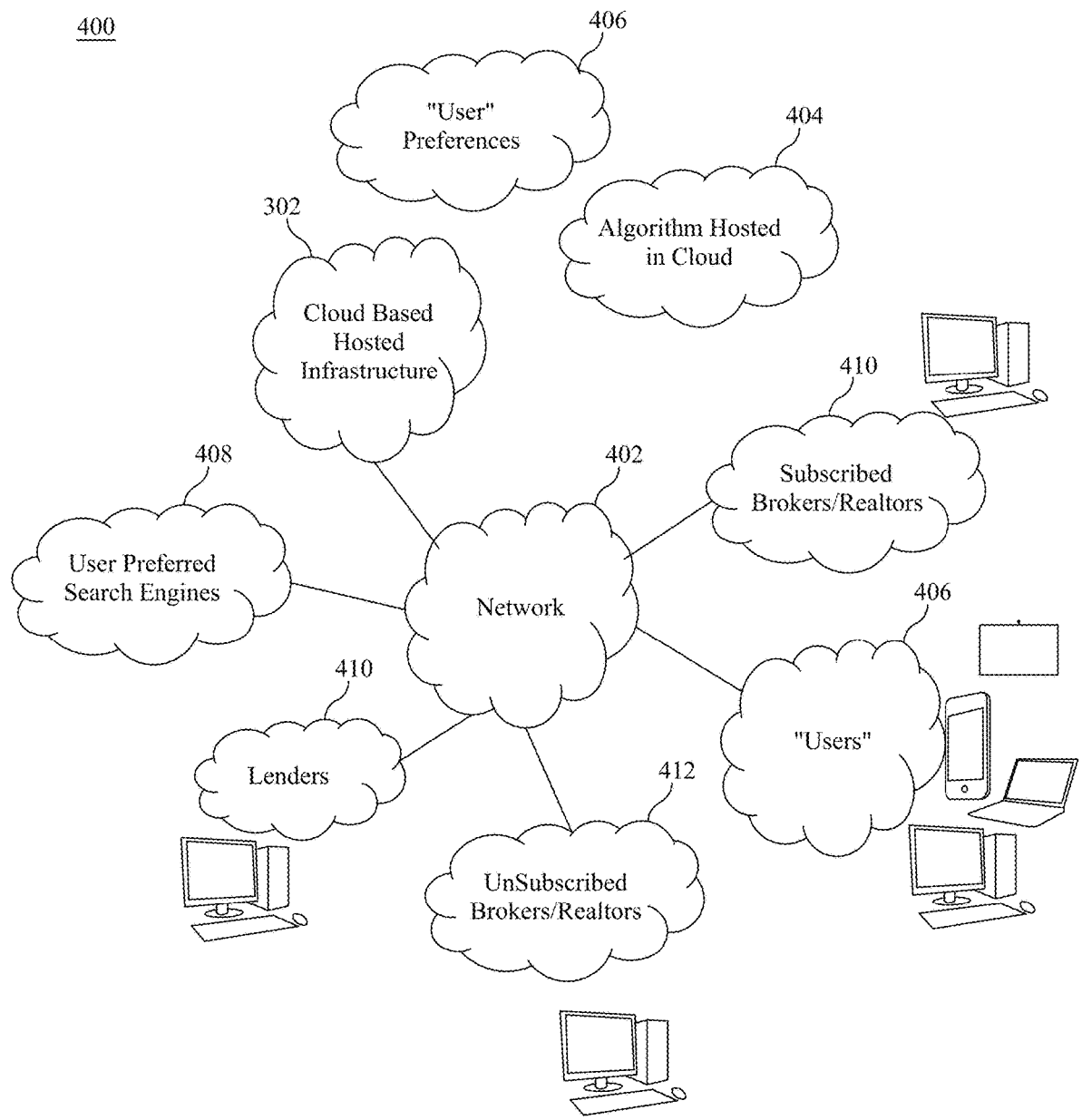
FIG. 4 shows another prioritization and organization system for real estate goods and services according to an embodiment.

Looking at the client side, the system 300 is also provided with various functionality intended to incentivize end users 306 to use the system 300 to find, e.g., services or products that they are interested in purchasing or using, e.g., within a geographic area of interest. For example, by providing users with filtered, ranked information about local real estate, etc., that they can rely upon to be accurate, the system 300 provides users 306 with a single interface for quickly obtaining all of this information without needing to navigate to numerous websites that may or may not have the information that they are seeking. Indeed, systems and methods designed in accordance with one embodiment can be used to gather, filter, prioritize and list different real estate properties for sale based on user preferences. A high-level architecture of such a system 400 is illustrated in FIG. 4.

Figure 1:
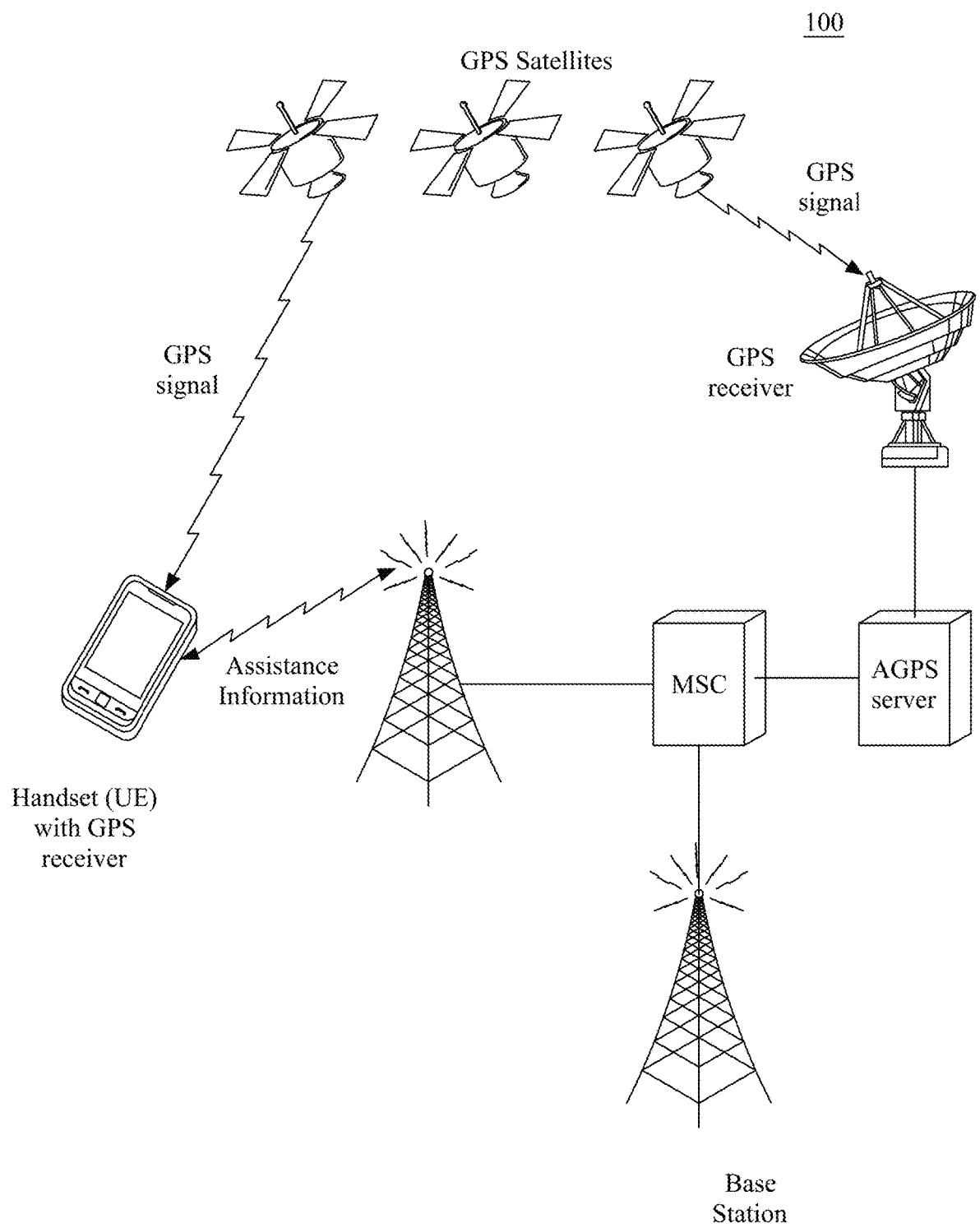
FIG. 1 depicts a radiocommunication system.
Figure 2A:
FIGS. 2(A)-2(D) illustrate various user interface screens associated with a conventional local mobile search application.
Figure 2B:
Figure 2C:
Figure 2D:
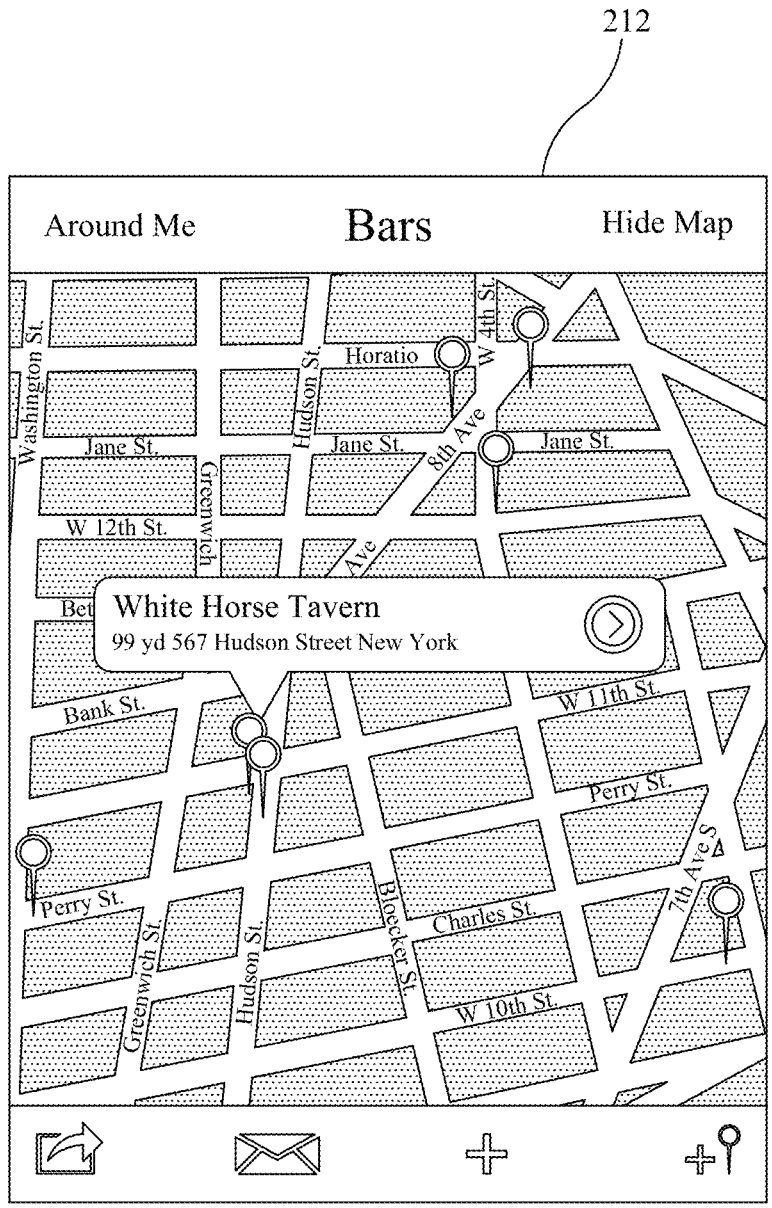

Therein, users 306 communicate with other nodes in the system via network 402 which can, for example, be or include a radiocommunication system 100 such as that illustrated in FIG. 1. This network 100 enables the users and their client app 306 to access the system 302 which includes one or more algorithms 404 for processing data associated with the desired goods or services using the user's preferences 406. Detailed examples of both algorithms 404 and user preferences 406 are provided below. In order to initially gather the data to be processed by the algorithms 404 in view of the user preferences 406, the system 302 can engage one or more user preferred search engines 408 via network 402. Also shown in FIG. 4 are various business entities including subscribed brokers/realtors 410, unsubscribed brokers/realtors 412 and lenders 414 which can selectively be provided with information associated with users preferred real estate properties as they use their client apps 306 to gather and prioritize information associated therewith.

It will be appreciated that although real estate properties or services are used as one example of goods or services that can be gathered and prioritized using systems and methods operating in accordance with embodiments described herein that the present invention is not limited thereto. Virtually any type of good or service is amenable to being processed in accordance with systems according to these embodiments including, for example, choices or preferences in dining, choices or preferences in vehicles, choices or preferences in couches, choices or preferences in vacations, choices or preferences in cleaning, or repair services, choices or preferences in bands or entertainment.

Returning to a more generalized discussion of the embodiments, there are several features incorporated therein which enhance systems and methods for prioritizing, organizing and selecting goods and services. These systems and methods enable the flexible preferences of the user, e.g., preferences 406 associated with the goods and services which can be categorized based on their relative strength as "musts", "wants", "haves", "do not wants", etc., and other options the user defines as personal emotional indicators. Additionally, these methods and systems can include optional collaborator weights in terms of those preferences, if permitted by the user of the client app 306. Detailed examples of how a user's preferences 406 (and collaborator preferences) are input (as part of an onboarding process) and used are provided below.

Generally speaking, however, in accordance with various embodiments, in order to process the preferences indicated by the user, the user selects the good or service sought, and the user determines the method for searching for that good or service, e.g., using one or more user preferred search engines 408. Once the search engine(s) or search methodology is identified, the system can process the data identified by the search engine(s) 408 using the algorithm(s) 404 and user preferences 406 for that good or service to organize and prioritize the rawer data provided by the search engine(s) 408 to generate, e.g., a ranked list of individual goods that are available. The user 306 can save, e.g., favorites of that selected good or service in memory in the cloud and/or on his or her local client device 306.

Figure 5A:
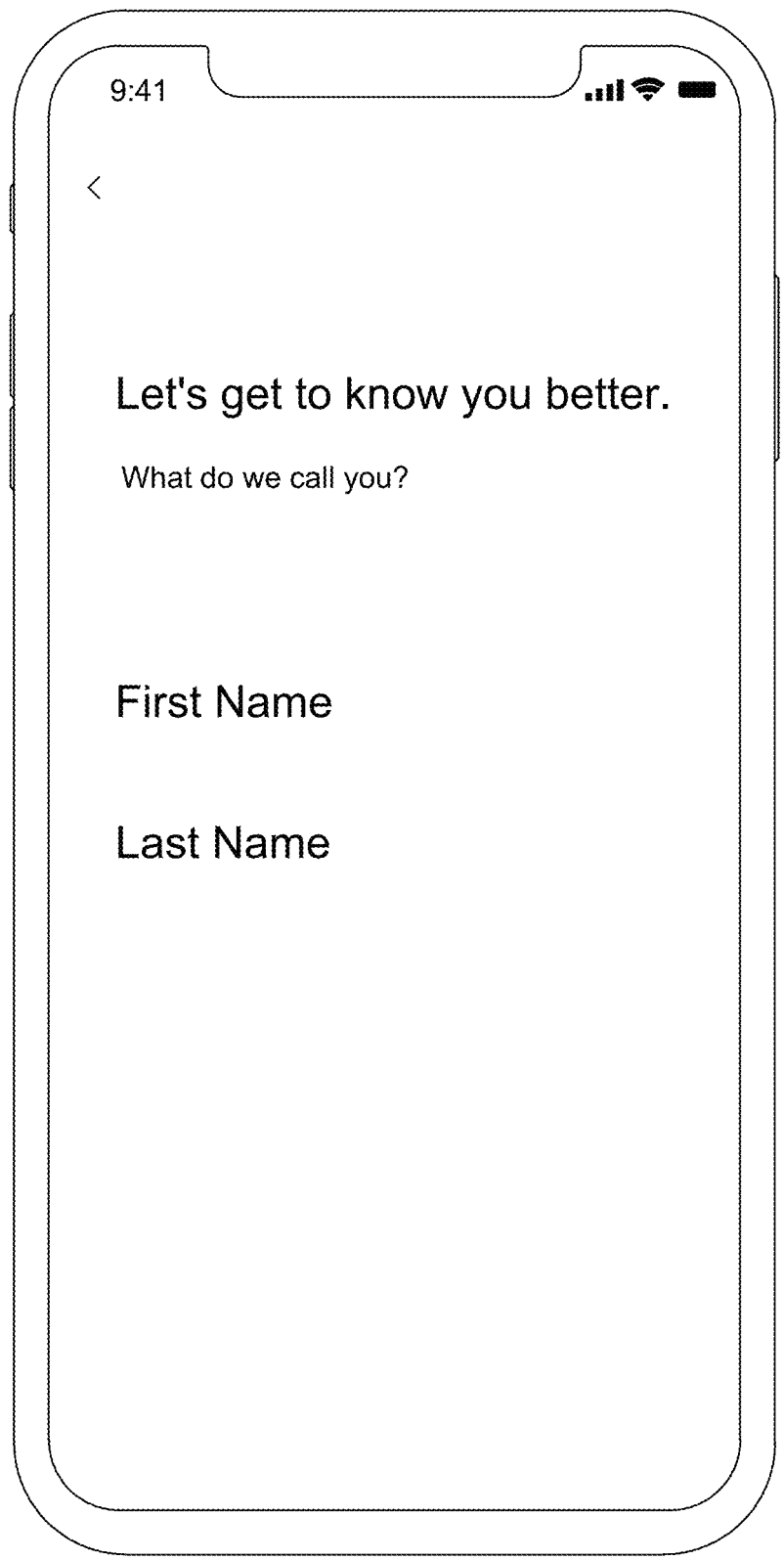
FIGS. 5A-5U depict various user interface screens associated with a client application associated with a prioritization and organization system for real estate goods and services according to an embodiment.
Figure 5B:
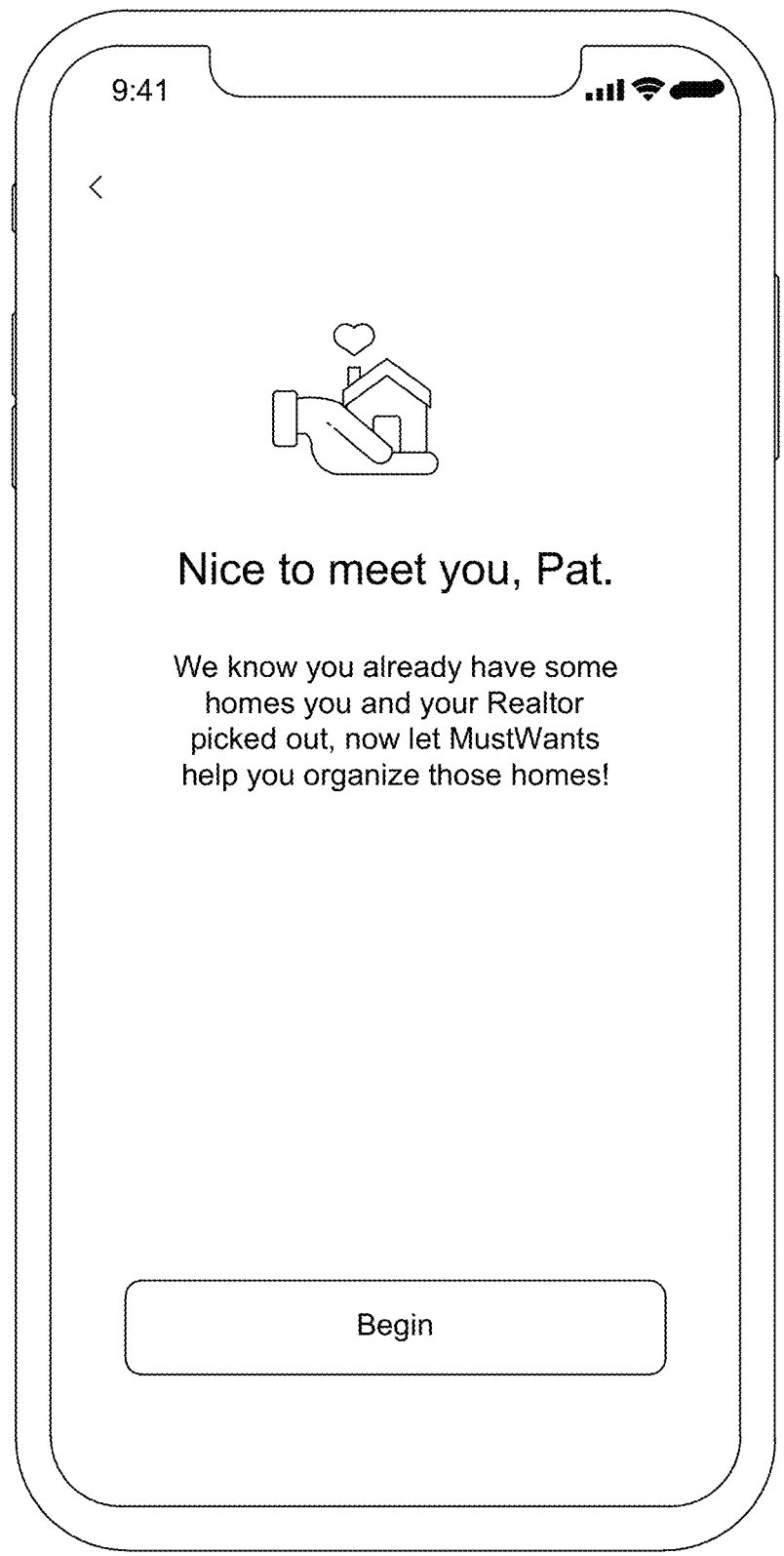
Figure 5C:
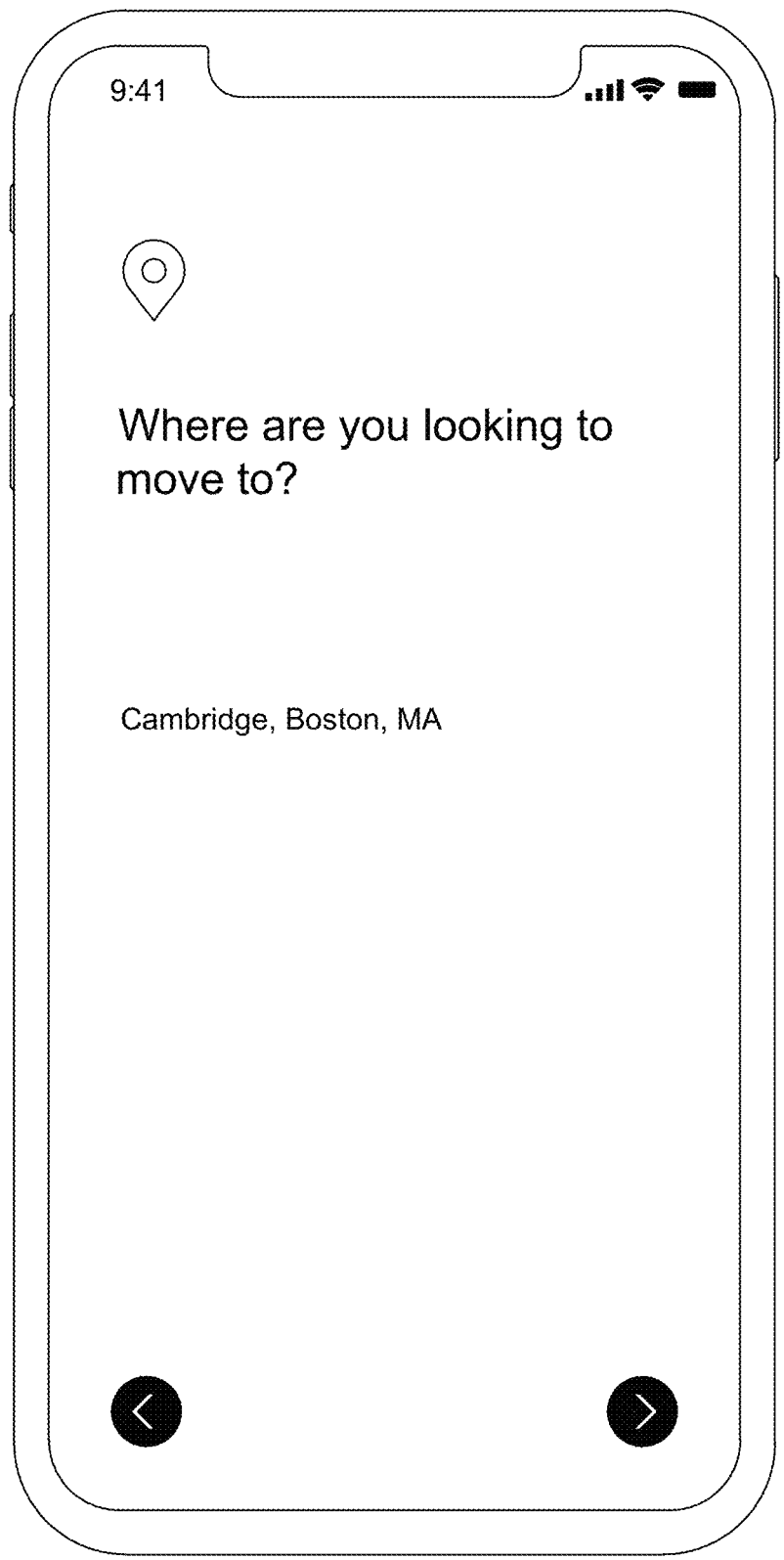

According to various embodiments, an individual user's preferences 406 for a particular good or service can be obtained by the system 302 by way of an onboarding process during which the user indicates his or her preferences via a question and answer session. An example will now be provided in the context of real estate services. Initially, as shown in FIG. 5A, the client app 306 can display a screen asking for the user's name. When the user has input his or her name (or other identifier), the client app 306 can then display a let's get started message, an example of which is seen in FIG. 5B. Some higher-level questions about the real estate that this user is interested in can then be presented as part of the onboarding process. For example, as shown in FIG. 5C, the client app 306 can display a user interface screen which prompts the user to input the area in which he or she is looking to purchase real estate.

Figure 5D:
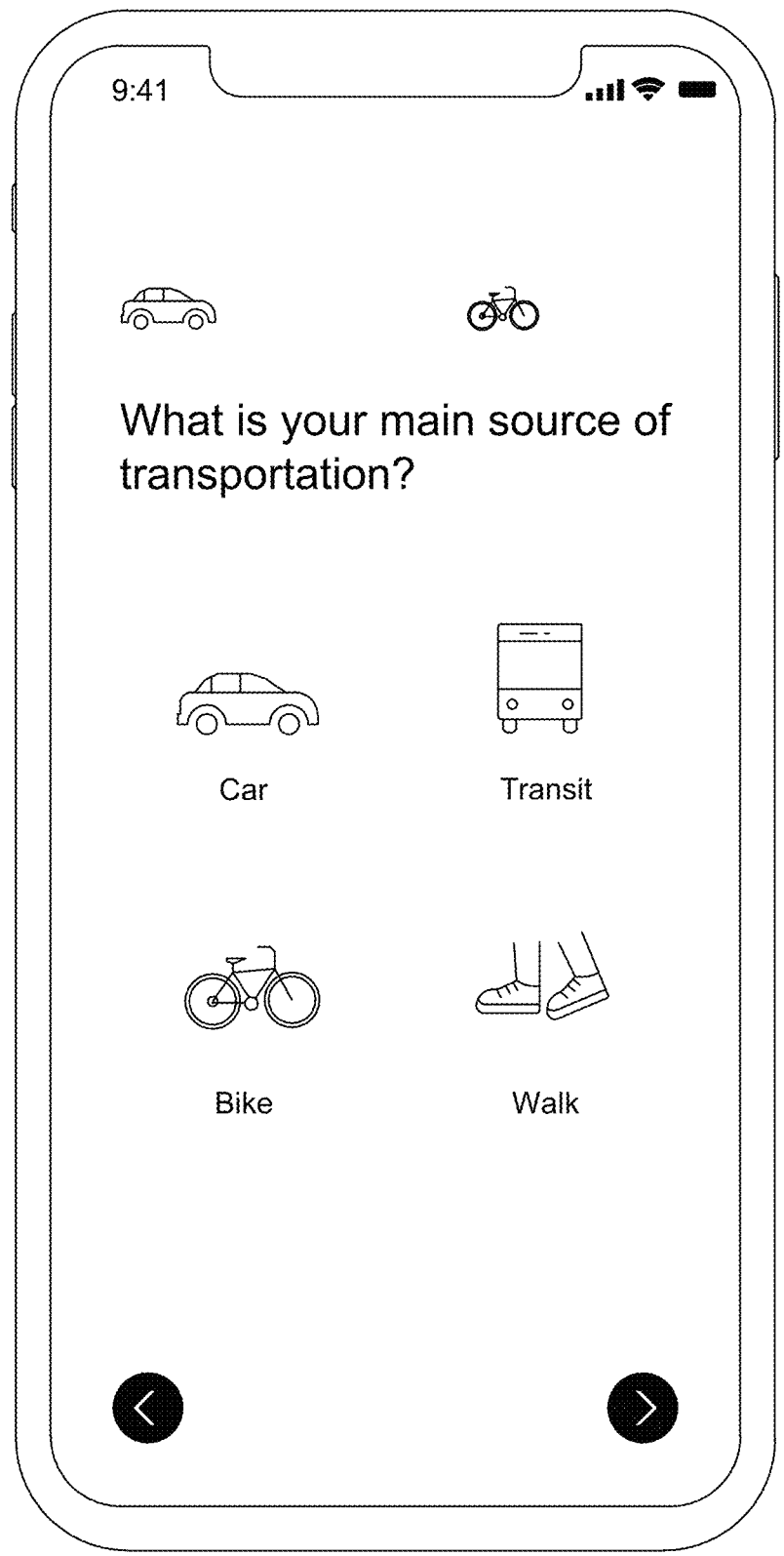
Figure 5E:
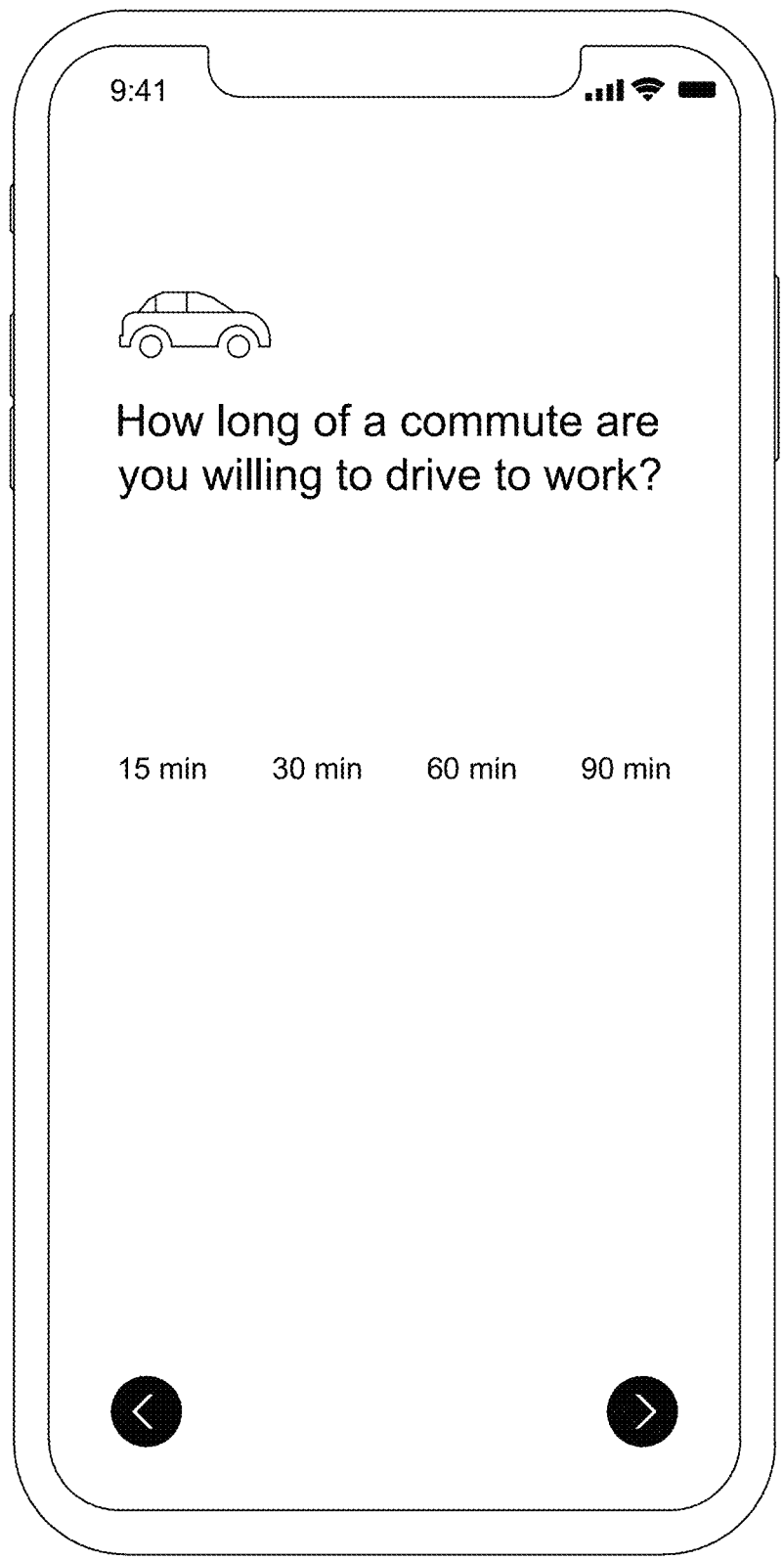
Figure 5F:
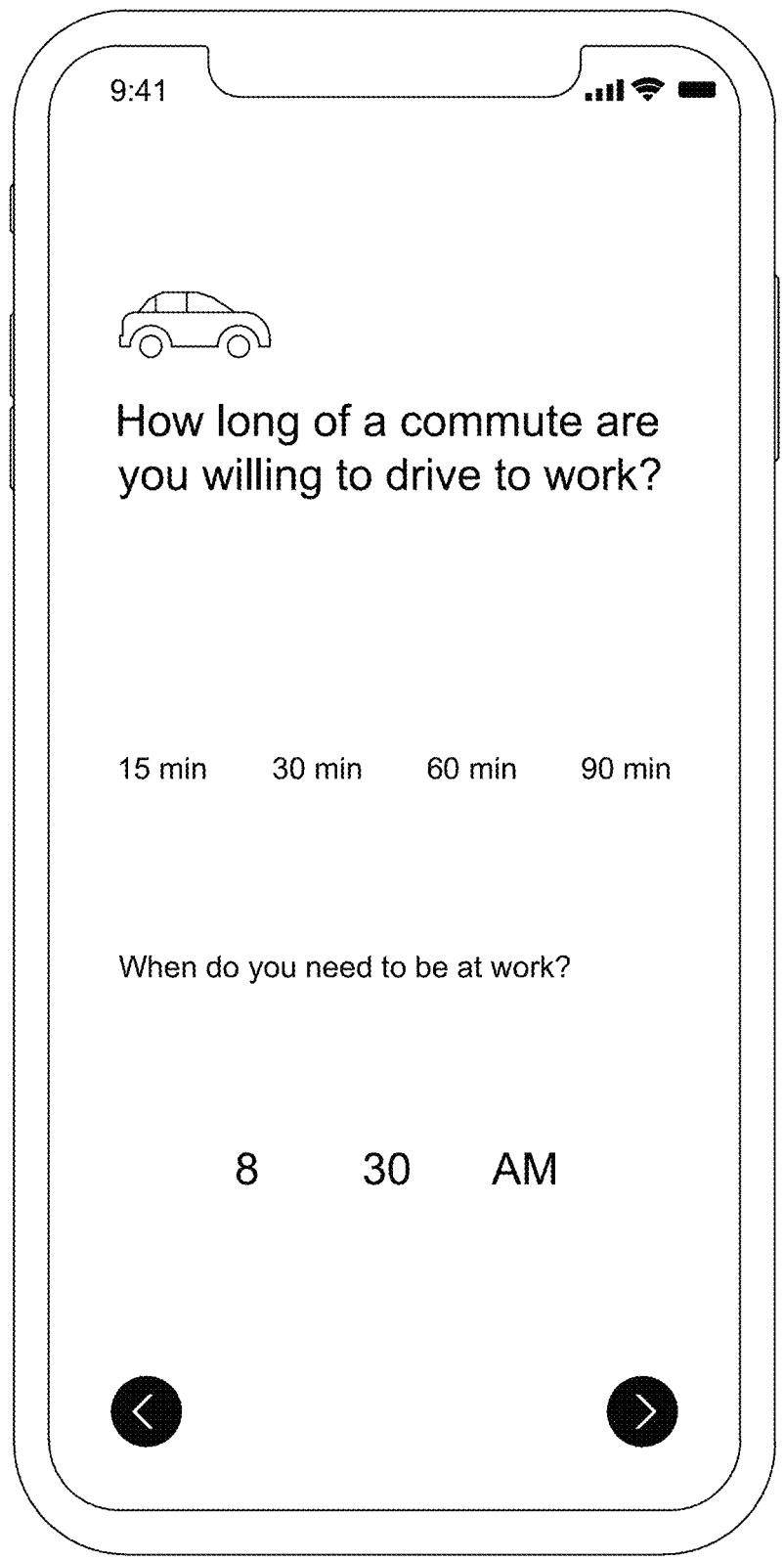
Figure 5G:
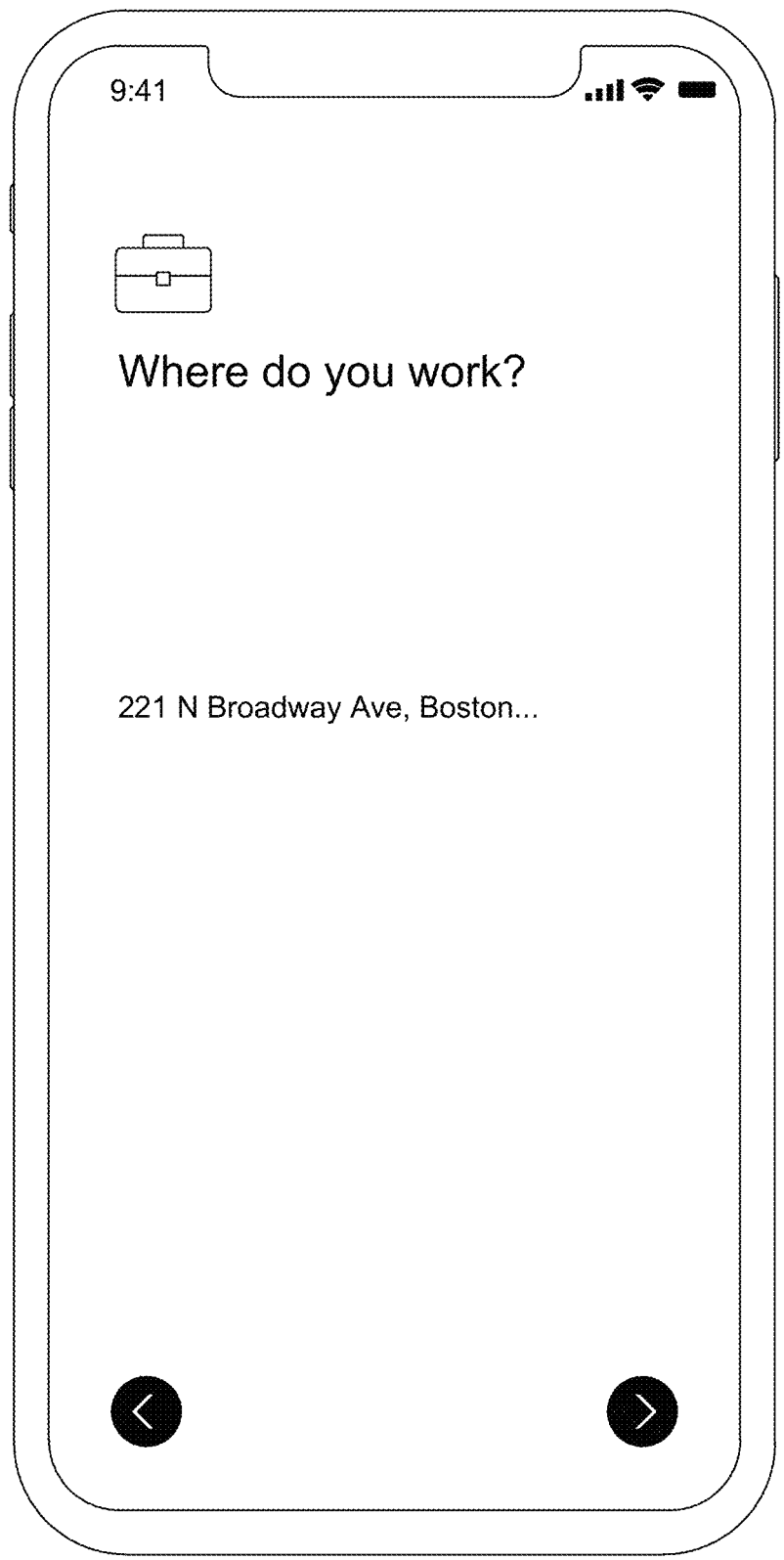

Typically, commuting is an important concern for people purchasing real estate or seeking a vacation or location for a business. According to embodiments, the onboarding process can thus acquire preference data about the user's commuting desires. For example, in FIGS. 5D and 5E, the client app 306 can ask about the user's main form of transportation and how long she or he is willing to commute to work each day. This topic can be further refined by also onboarding the user's time at which she or he needs to be at work as shown in FIG. 5F and where his or her workplace is located in FIG. 5G. The client app 306 could, of course, ask additional questions regarding commuting depending upon how the algorithm(s) 404 are designed. In addition, commuting time to schools, restaurants, stores, churches, parks could also be included to refine the priority and preferences.

Figure 5H:
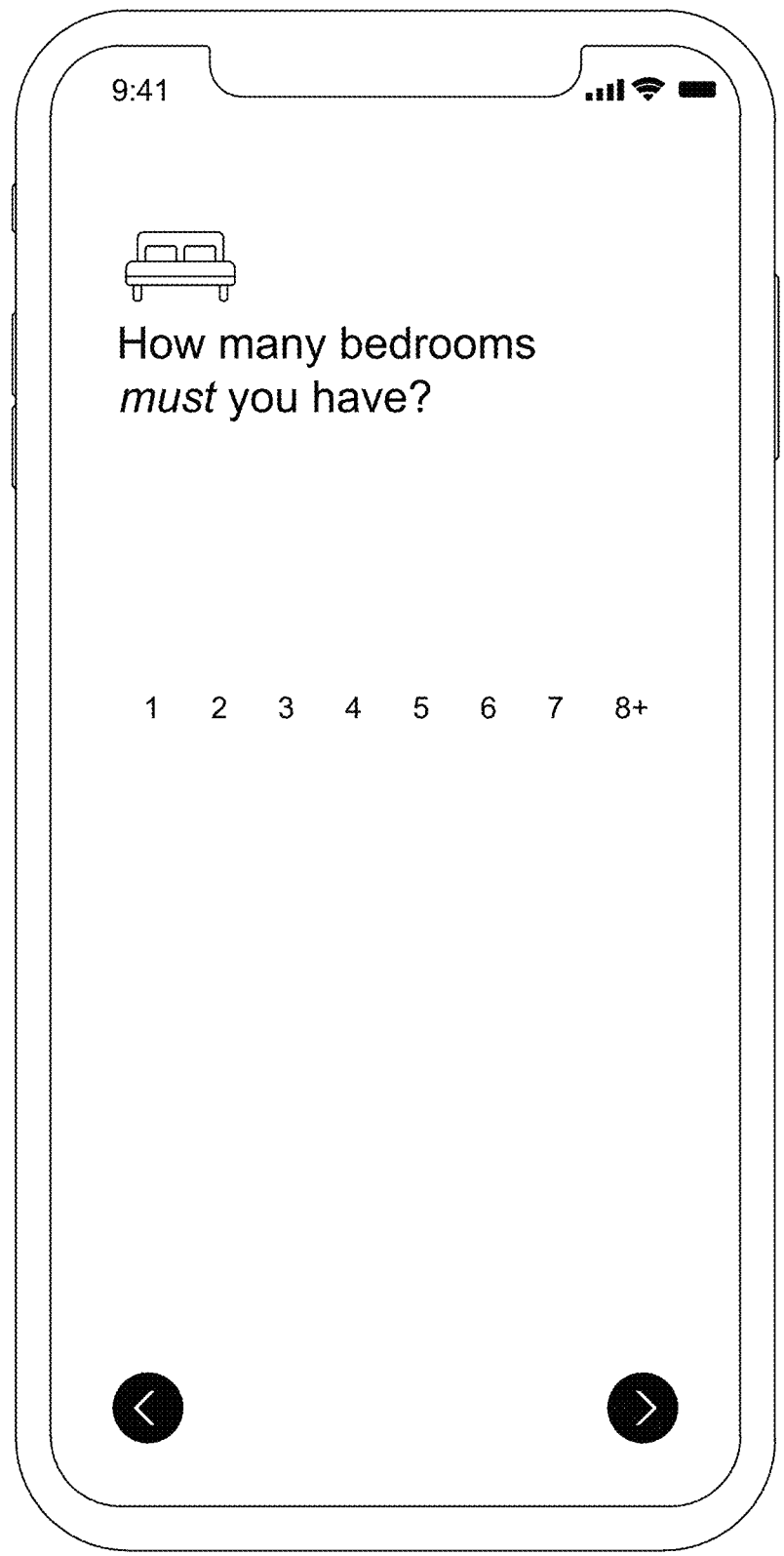
Figure 5I:
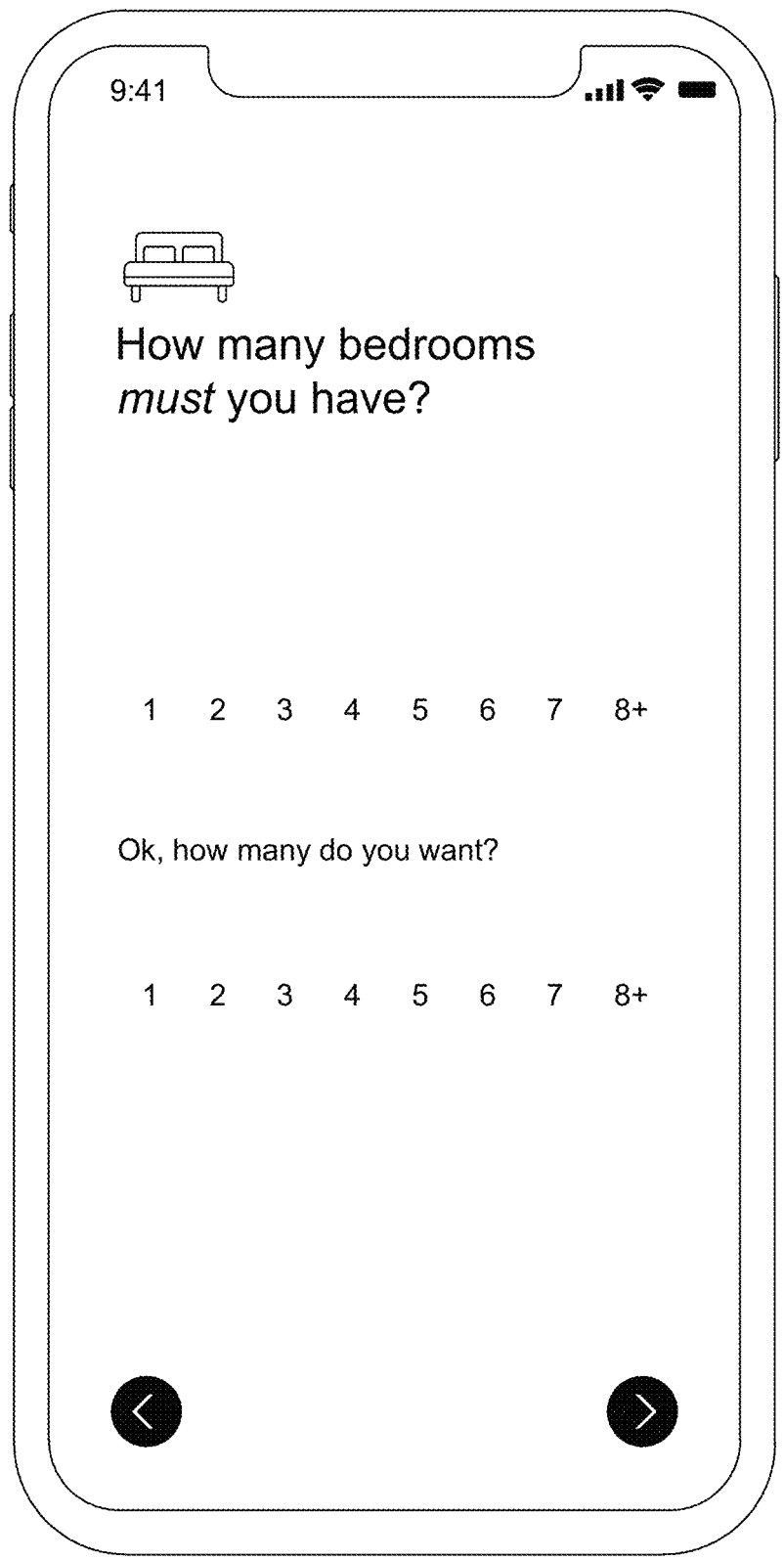
Figure 5J:
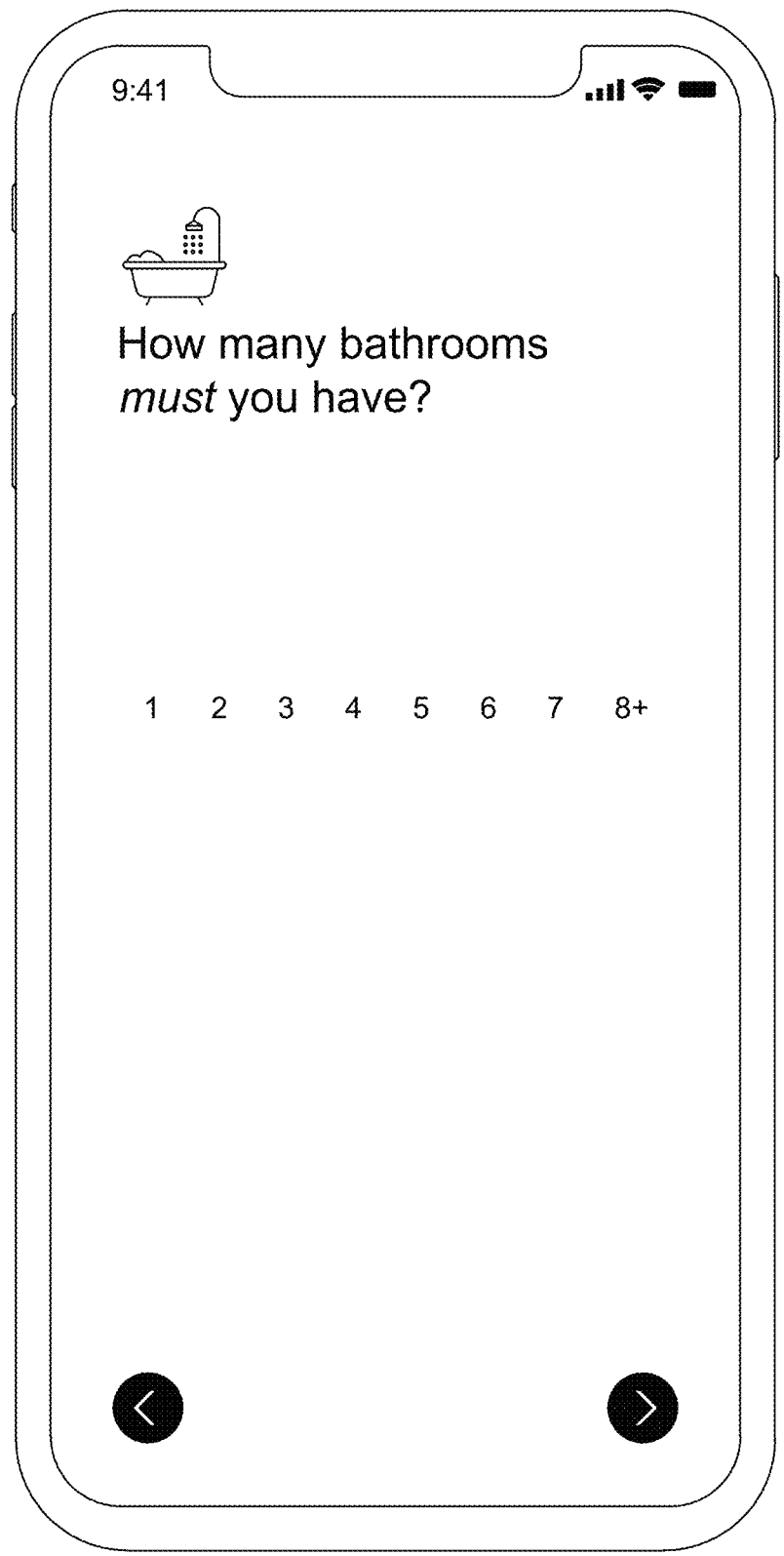
Figure 5K:
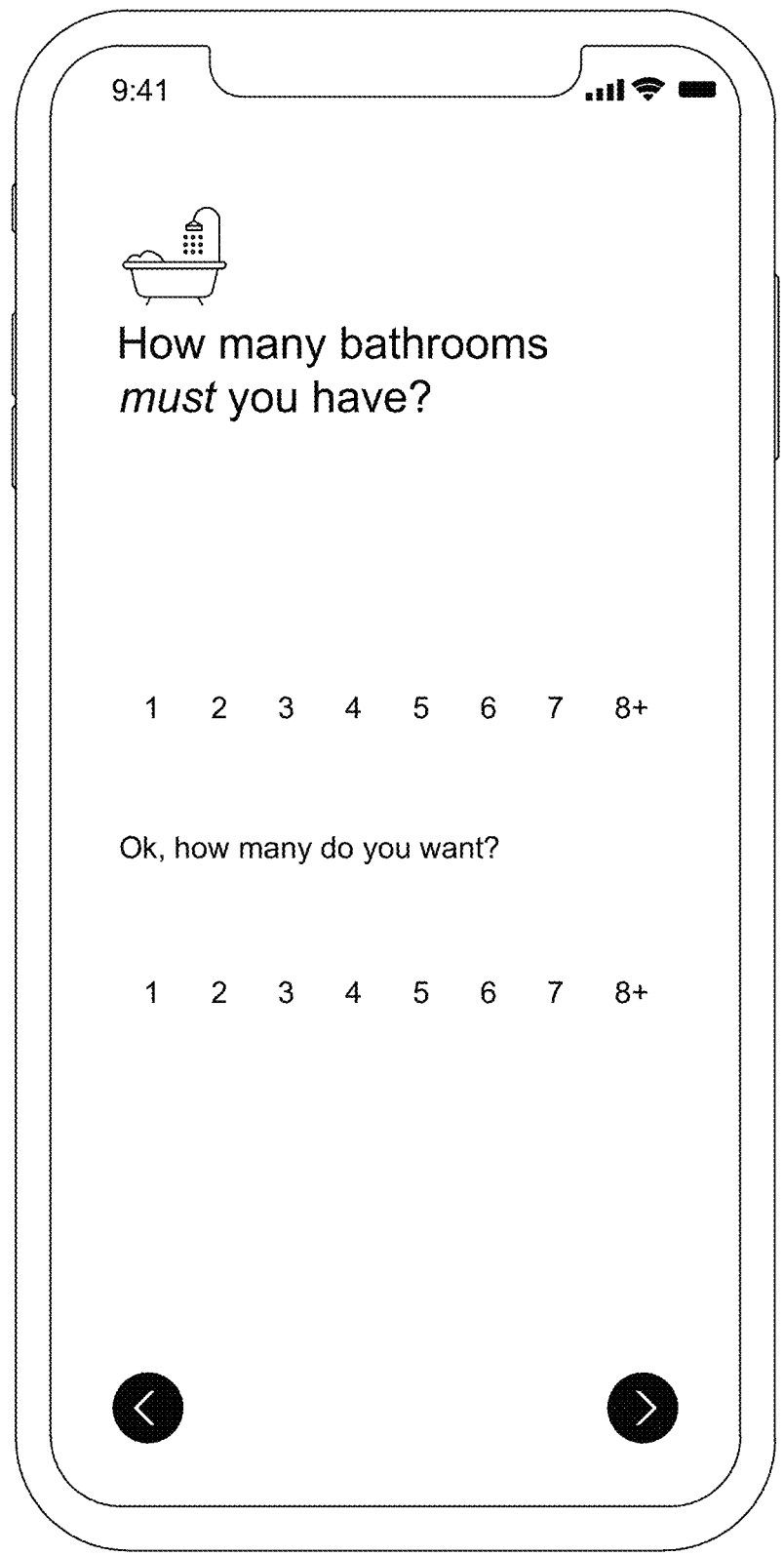

Another category of preferences related to the purchase of real estate revolves around aspects of the desired property itself. For example, if the property of interest to the user is a residential home, then he or she might have a desired number of bedrooms that the property should have. Note that, in this context, embodiments can be tailored to further onboard user preference data in a more nuanced fashion, for example by distinguishing between so-called "must haves" and "want to haves". Thus, as seen in FIGS. 5H and 5I, respectively, the client app 306 can ask the user to input both the number of bedrooms that the user's to be purchased property "must have" and how many bedrooms the user would "want to have". Similarly, as seen in FIGS. 5J and 5K, respectively, the onboarding process can ask the same questions about the number of bathrooms. Such questions regarding preferences about the attributes of the desired process can, of course, continue, however in the interest of brevity the discussion now turns to other aspects of home buying.

Figure 5L:
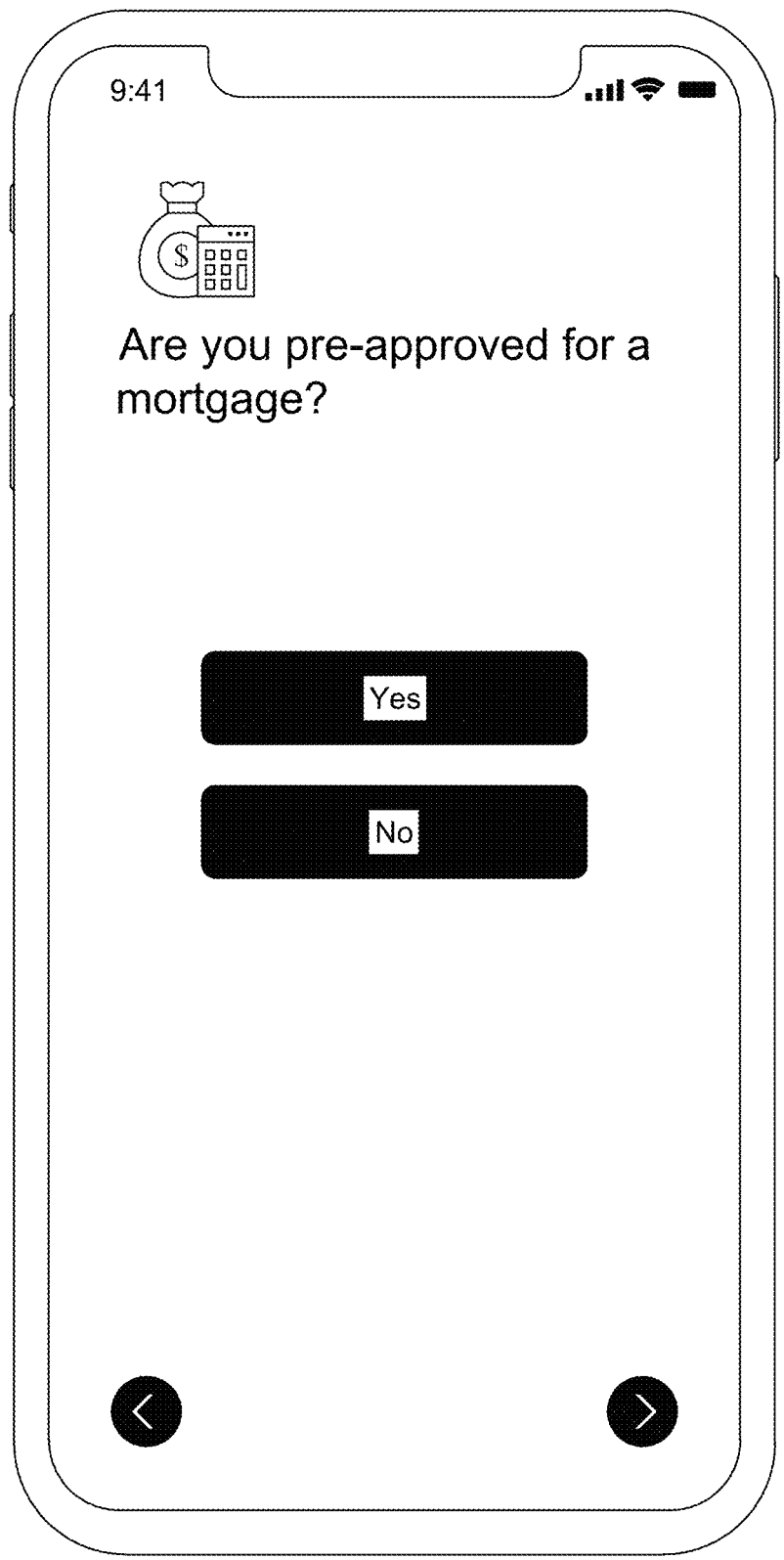
Figure 5M:
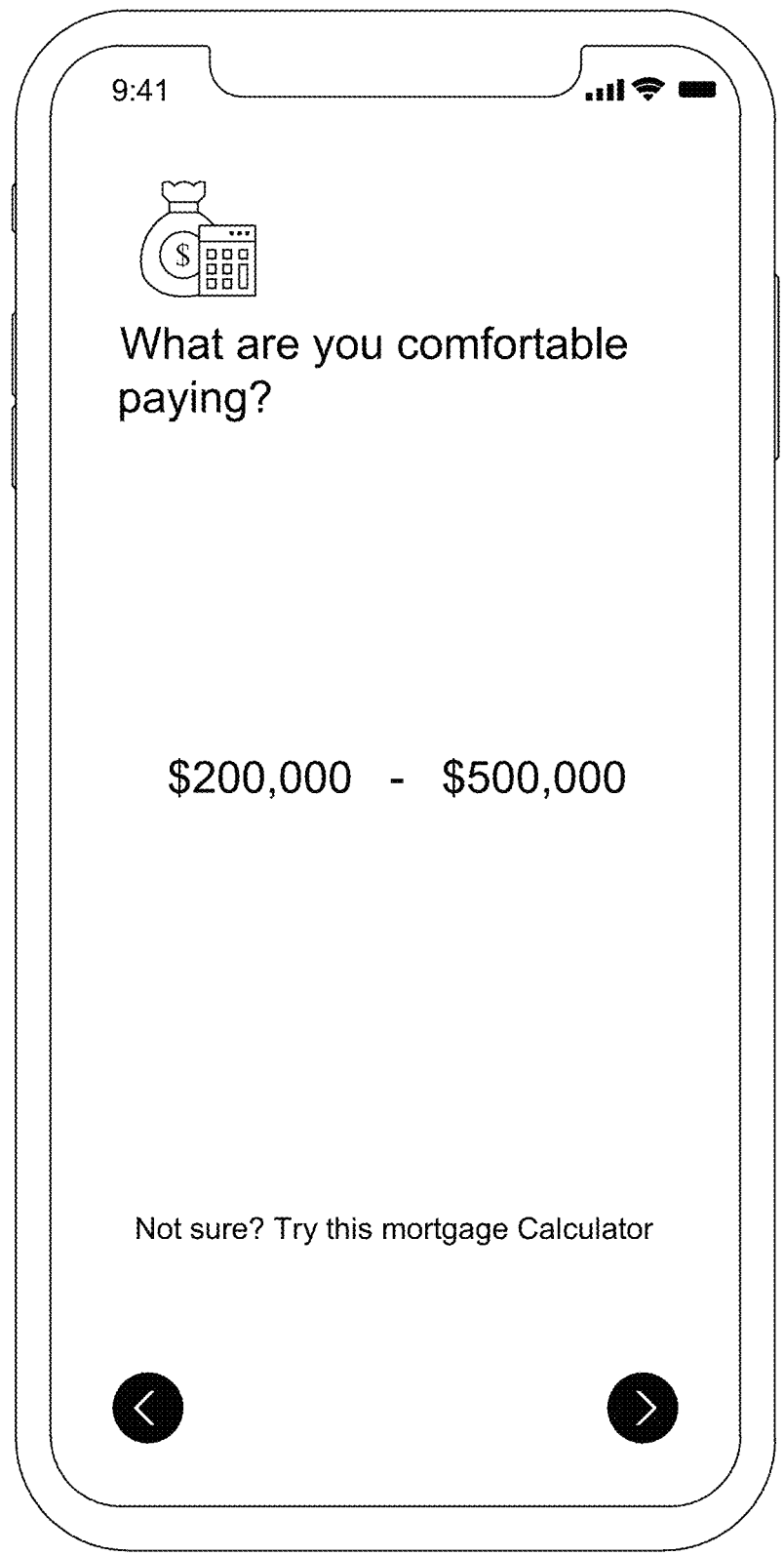
Figure 5N:
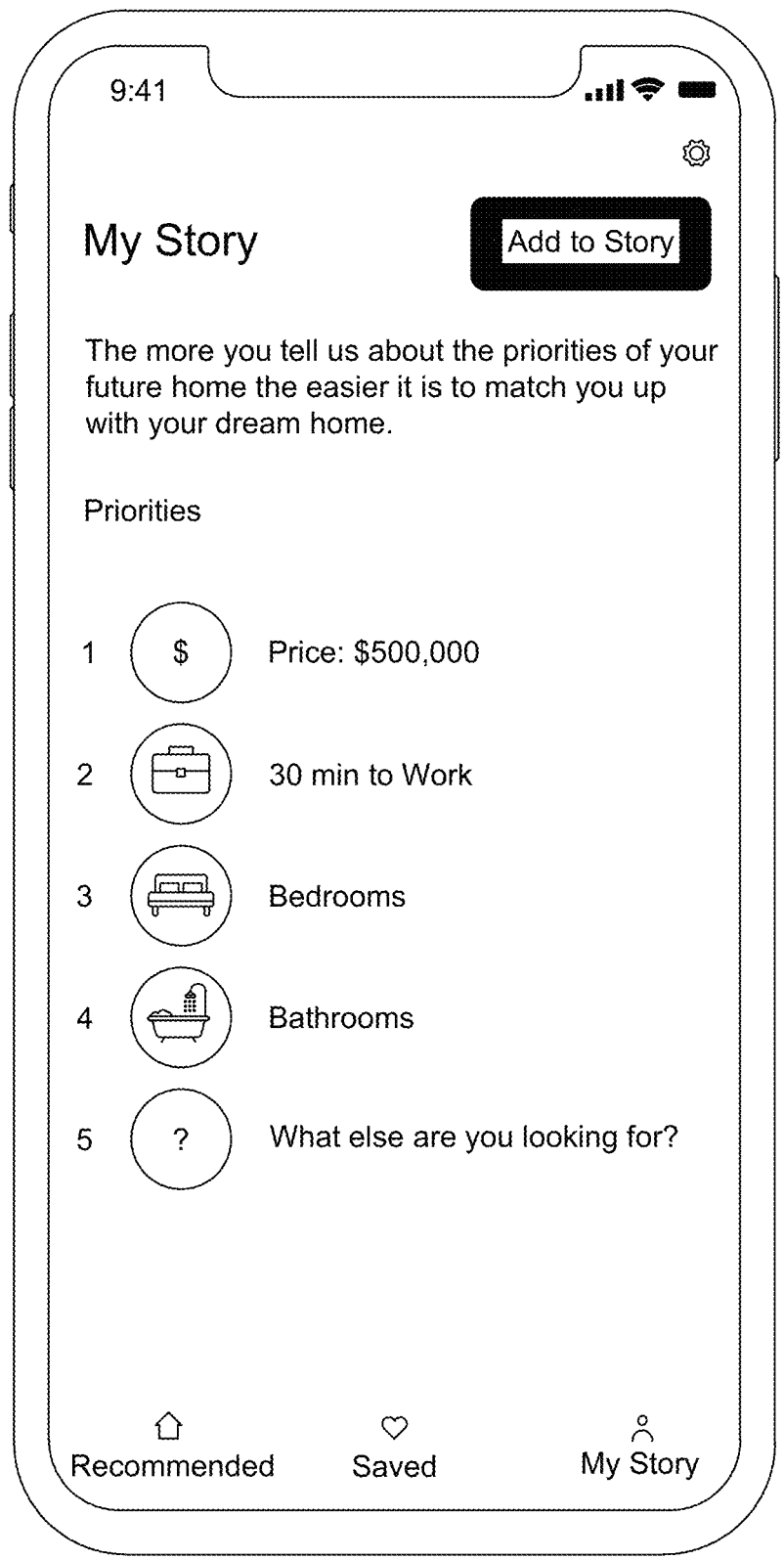
Figure 5O:

Thus, as shown in FIG. 5L, the client app 306 can ask the user if he or she is pre-approved for a mortgage or, alternatively (or additionally) the client app 306 can ask the user the purchase price range for the property that she or he is comfortable with as shown by the user interface scree of FIG. 5M. The onboarding process can continue by starting to use the information already gathered to refine the user's preferences. For example, as shown in FIG. 5N, the client app 306 can ask the user to prioritize the user's previously input purchase price, distance to work, number of bathrooms, number of bathrooms, etc., and can add additional priorities which were not previously specified. FIG. 5O shows another version of the user interface screen of FIG. 5N with a different list of prioritized preferences.

It will be appreciated by those skilled in the art that the examples of different types of preferences that could be presented to a user 306 as part of an onboarding process according to the various embodiments described above is not exhaustive and that many other preferences could be specified and then prioritized. Using the specified and prioritized preferences 406, the system 302 using algorithm(s) 404 and data acquired from the selected search engine(s) 408 can then generate and display a list of recommendations of the desired product or service, e.g., real estate properties, an example of which is illustrated in the client app 306 screenshot shown in FIG. 5P. Therein it can be seen that the list indicates a number of things about each property, for example the number of must haves that the property satisfies, as well as specifications of what each property provides relative to the user's prioritized preferences. For example, the recommended list could display the metrics associated with the top for preferences in the user's preference list, e.g., how long will it take to reach my workplace, how long will it take to reach my wife's workplace, how far away is the beach and how far away is our daughter's school. Using these embodiments, no longer does a user have to guesstimate at these important values his or herself, instead the system 302 delivers them and presents them on the user's client device 306. More information regarding the prioritized list of recommended products or services is provided below.

Figure 5P:
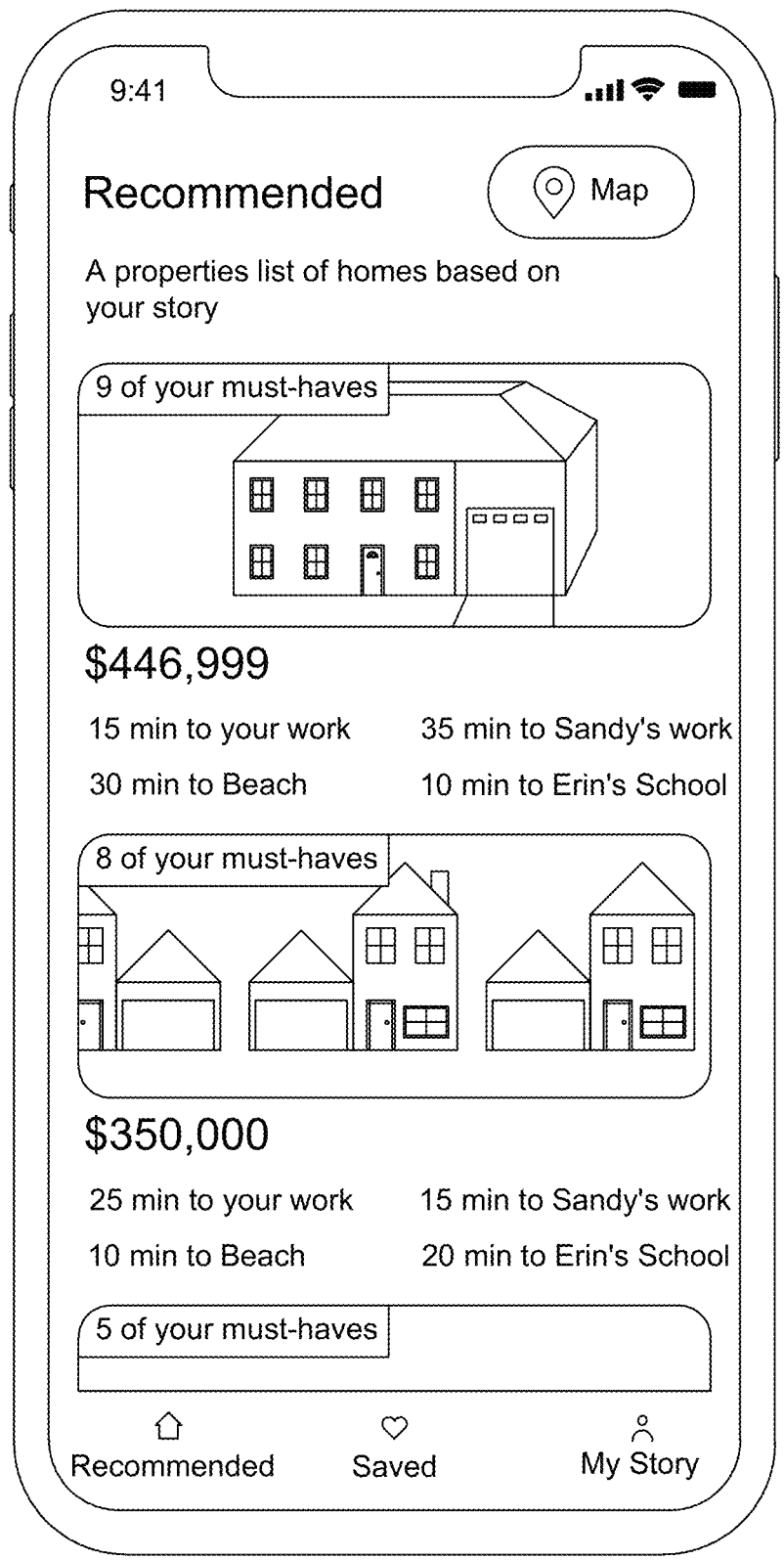
Figure 5Q:
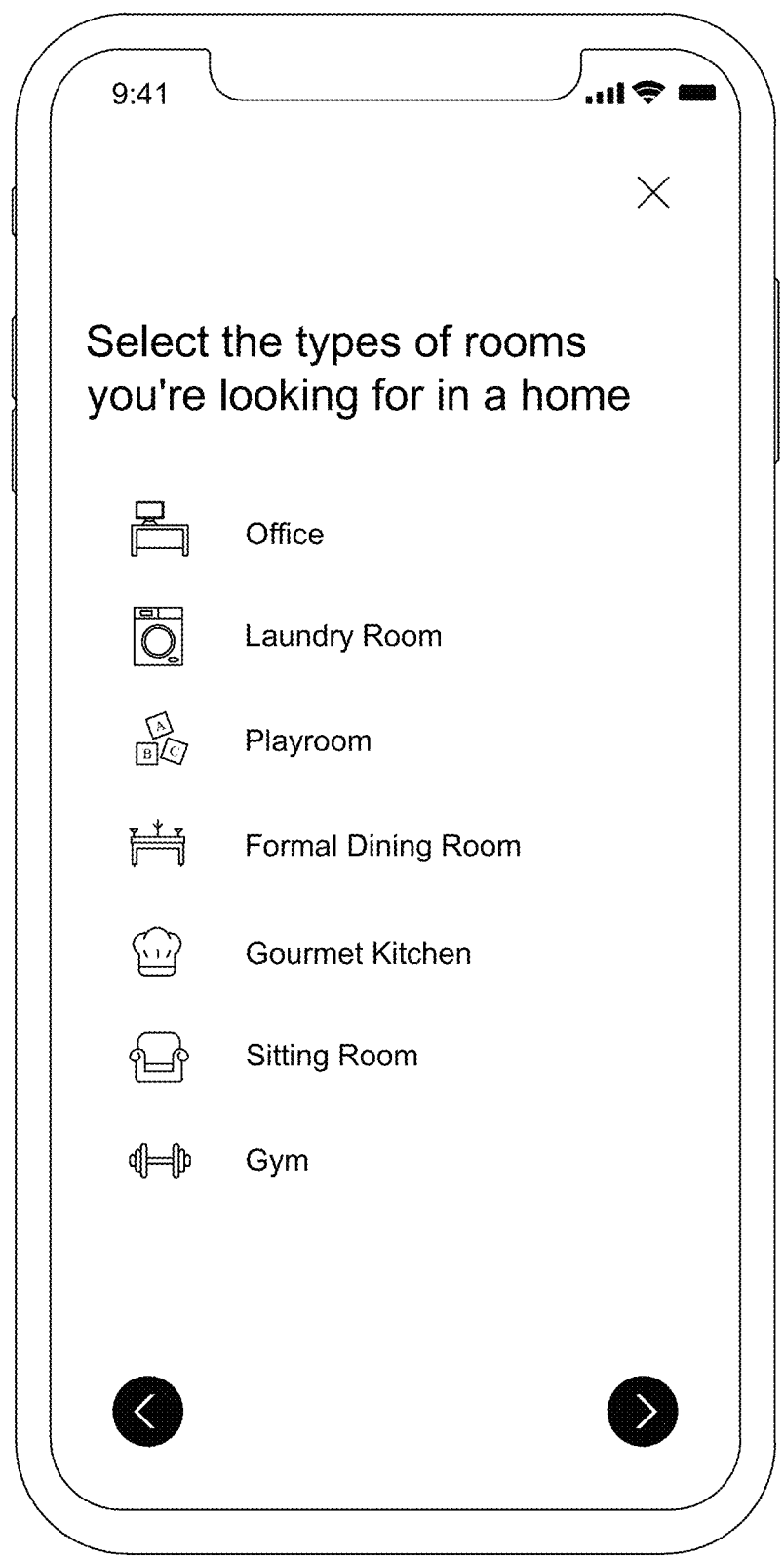
Figure 5R:
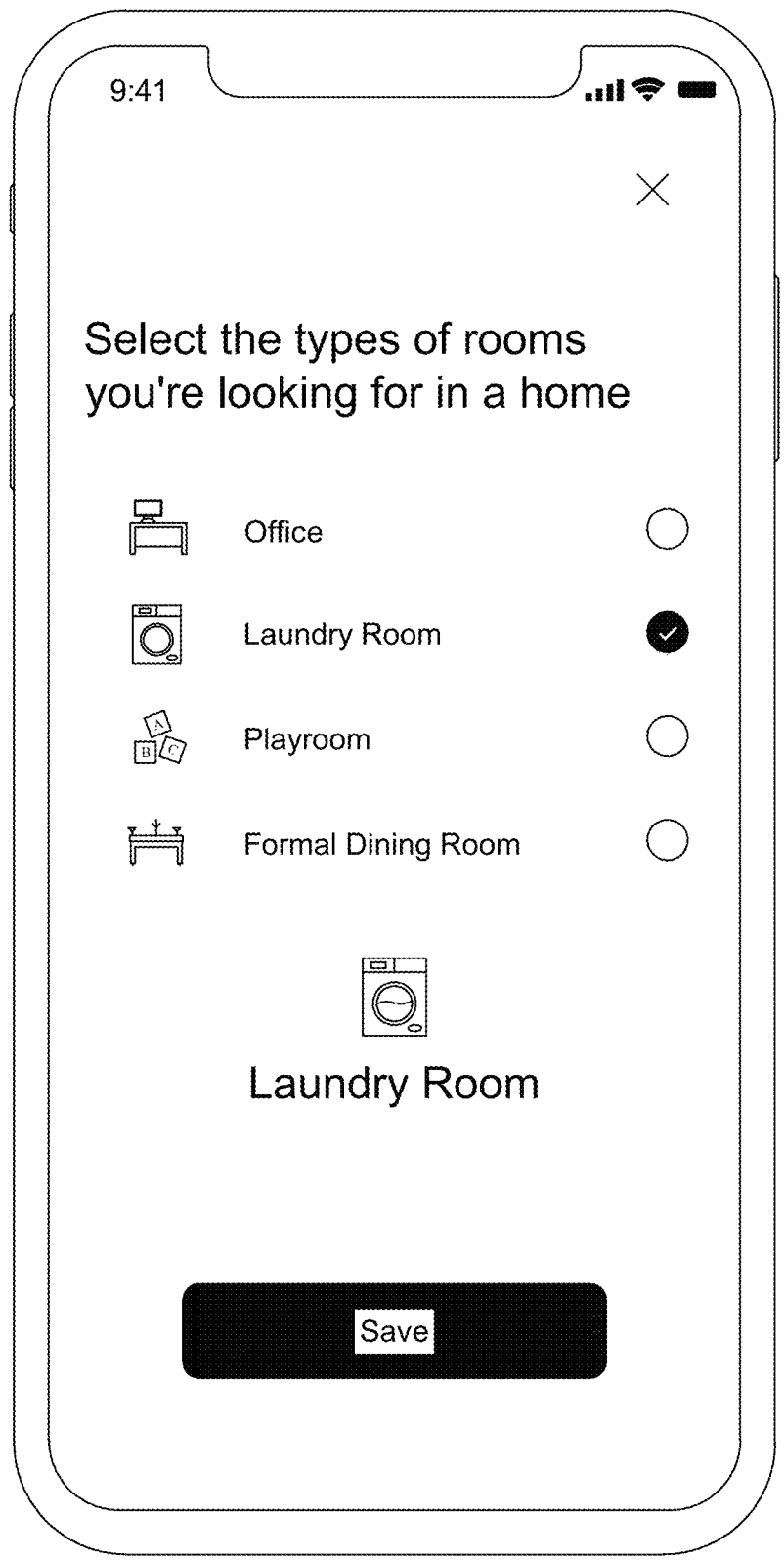
Figure 5S:
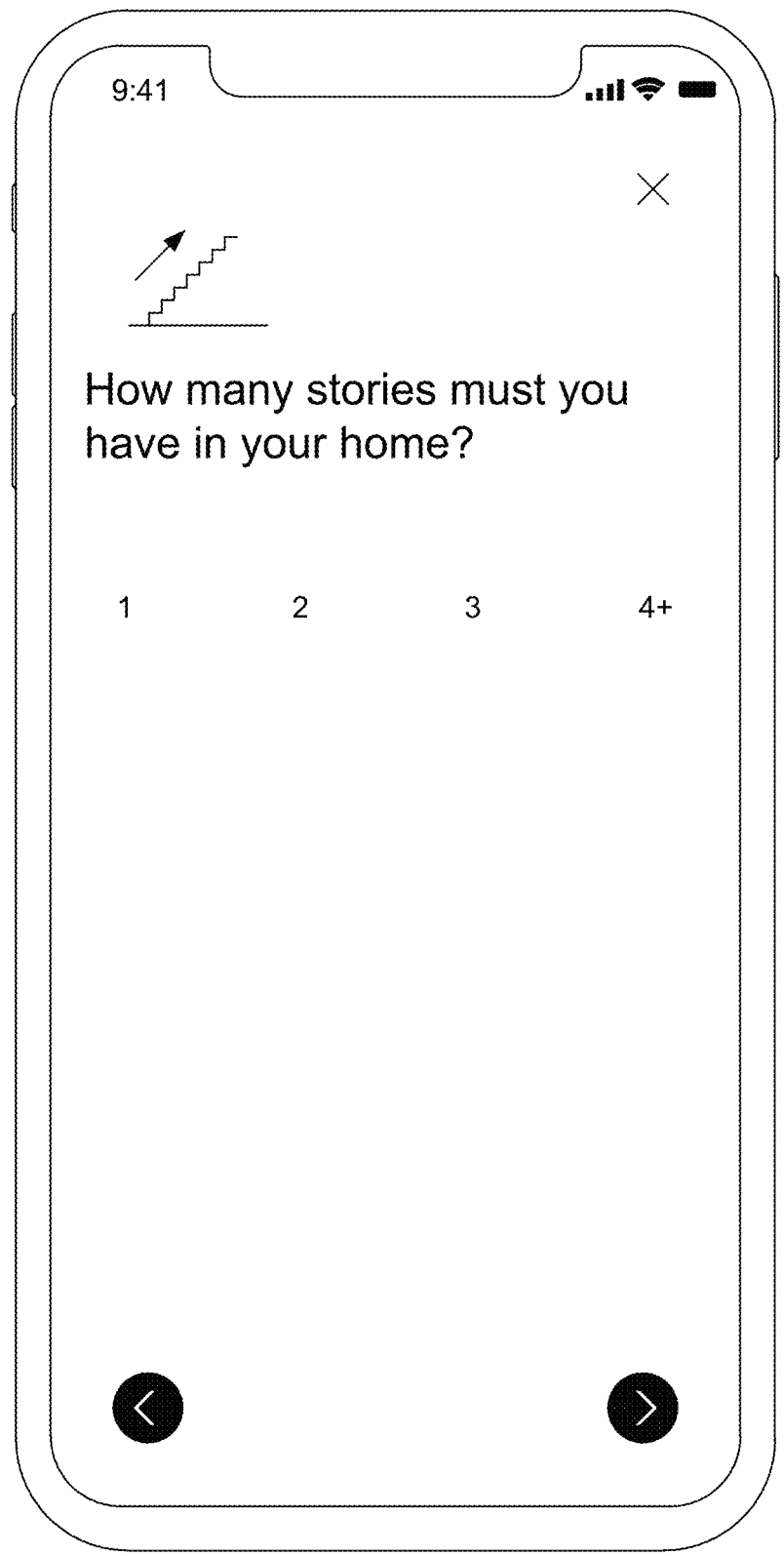
Figure 5T:
Figure 5U:
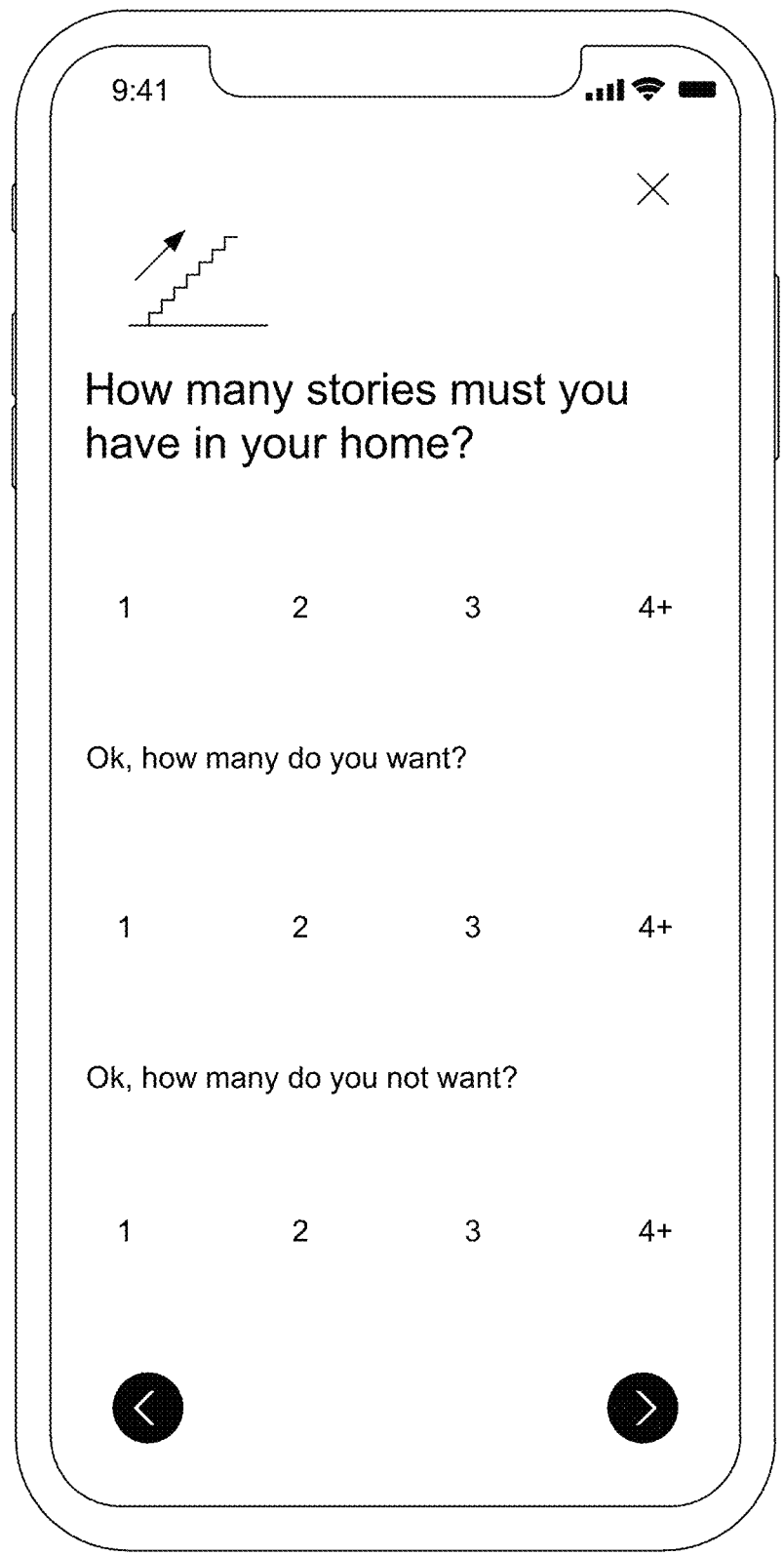

The onboarding process according to some embodiments can involve a more detailed series of additional questions regarding what a user is looking for in the context of the relevant goods and services. For example, continuing with the real estate embodiment, the user can be prompted to indicate other types of rooms that she or he is looking for in a property using an input screen such as that shown in FIG. 5Q. Like other preferences which are set during the onboarding process, room type can also be assigned its own internal priority as shown, for example, in FIG. 5R. Alternatively, the onboarding process could ask the user for his or her preferences and preference priority in different ways see, e.g., FIG. 5S. Preference priorities for a given preference can have several dimensions, e.g., the system 302 could ask a user both how many stories a property must have for him or her to be interested, but also ask that user how many stories he or she would want the property to have, an example of which is shown in FIG. 5T. Indeed, according to some embodiments, preference types (e.g., number of stories) can have many different type values, e.g., as shown in FIG. 5U.

Before discussing that, however, a more detailed discussion regarding how the system 302 uses the preferences 406 to generate the prioritized list of recommendations is first presented. In order to generate the prioritized or ranked list of recommended products or services, the system 302 first takes the data obtained by the search engines, e.g., property listing data of properties for sale in a certain zipcode or set of zipcodes, and assigns scores to each property for each preference expressed by the user as being important to him or her in their search. For example, if a user selects distance to work of 30 minutes or less as a must have preference, the system 302 could use the raw list provided by the search engines 408 of properties within the desired zipcode or set of zipcodes and assign a score to the "work commute time" preference based on the distance of each property from the user's work place. The scoring for this parameter could be performed in any desired way. For example, the system 302 could assign a score of 1 to a property that is within 6 minutes, a property that is within 12 minutes a score of 1, a property that is within 18 minutes a score of 2, a property that is within 24 minutes a score of 2, a property that is within 30 minutes a score of 3 and any other property that is further than 30 minutes a score of 4. The latter is purely an illustrative example and any desired scoring system can be put into place for each preference attribute.

For example, using a desired algorithm, the system 302 could generate a set of score values for each of the user 306's top preferences for one property as exemplified in Table 1 below using the prioritized preferences shown in FIG. 5O.

TABLE 1

| Priority | Preference | Score |
|---|---|---|
| 1 | 30 Min To Beach | 1 |
| 2 | 30 Min to Work | 1 |
| 3 | Within 5 Miles of School | 1 |
| 4 | Big Yard | 1 |
| 5 | Dog Friendly | 1 |
| 6 | Bedrooms (Must 3) | 2 |
| 6 | Bedrooms (Want 4) | 1 |
| 7 | Bathrooms (Must 2) | 2 |
| 7 | Bathrooms (Want 3) | 1 |

As seen in Table 1, and as discussed previously, some preferences can, in addition to being assigned a general priority level which ranks each preference relative other preferences, can also have different internal preference indications, e.g., the number of bedrooms that the user 306 must have is 3, but wants to have 4 bedrooms. In the example of Table 1, the property being scored had 3 bedrooms and 3 baths, thus scoring 2 for the desired quality of having 3 bedrooms, but scoring 1 for the desired quality of 3 bathrooms.

Once the system 302 has scored all of the relevant properties for each user preference 406, it can then generate a composite score for each property using one of the algorithms 404 and the previously generated preference scores. According to one embodiment, the composite score (also referred to herein as the "ranking value" can be calculated using an algorithm 404 as:

$$\text{Ranking value} = (\text{Average of High Importance Scores} + \text{Average of Moderate Importance Indicia Scores} \times 0.1 + \text{Average of Low Importance Indicia Scores} \times 0.01 \times \text{Human Factor} \times \text{Neighborhood Influencer}) \quad (1)$$

where Human Factor is an average of rankings given by area experts and/or property owners for each specific property and Neighborhood Influencer is a multiplier based on demographics. In equation (1) it can be seen that the ranking value is calculated by summing weighted averages of high, moderate and low importance scores (such as those shown in Table 1). Initially, it should be noted that although equation (1) bins the user's preferences into three different levels of importance, that different embodiments can use any number of bins. For example, as previously discussed, a user can categorize a preference as being a "must", a "want", a "have", and/or a "do not wants". According to some embodiments, a user 306 can select the number of bins him or herself to personalize the ranking system 302.

Similarly, although the three weighting factors illustrated in equation (1), i.e., 1, 0.1, and 0.01 for high importance, moderate importance and low importance indicia average scores, respectively, those skilled in the art will appreciate that other weighting values can be chosen to appropriately weight different importance levels and generate a ranked list which accurately reflects a user's desired product or service, e.g., a real estate property. Like the number of preference bins, according to some embodiments, the user 306 can select the weighting values him or herself.

Moreover, according to some embodiments the Human Factor and/or Neighborhood Influencer multipliers can be omitted.

As mentioned previously, equation (1) is one example of an algorithm 404 which can be used to generate a ranked list of products or services. Other embodiments can use other algorithms. For example, algorithm 404 can include equation (2) below for calculating the ranking value.

$$\text{Ranking value} = (\text{Average of High Score Values for one Building} + \text{Average of Moderate Score Values for one Building} \times 0.1 + \text{Average of Low Score Values for one Building} \times 0.01 \times \text{Human Factor}) \quad (2)$$

where Human Factor is the average of rankings given by area experts for the property on a scale of (0, 0.1, 0.2, 0.3 . . . to 1.0).

Thus, in the embodiment associated with equation (2), a maximum result of 10.11 may be obtained as follows for any property (assuming that scoring values are 1-10 per preference rather than 1-100 as shown in the example of Table 1):

$$\text{Max Result} = \text{Round}(10 + 10 \times 0.1 + 10 \times 0.01, 2) \times 1 = 10.11 \quad (3)$$

Figure 6A:
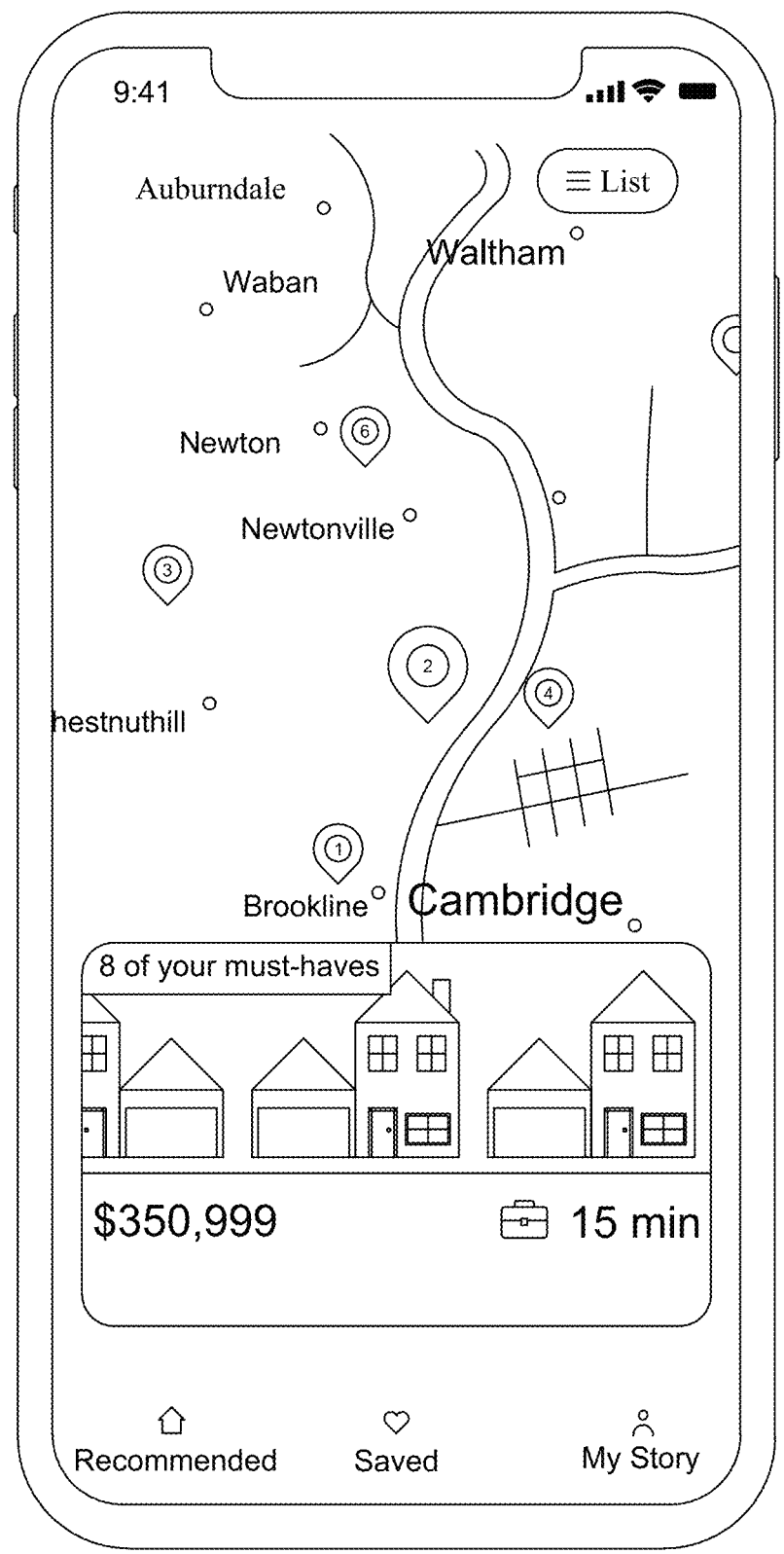
FIGS. 6A-6E show various other user interface screens associated with a client application associated with a prioritization and organization system for real estate goods and services according to an embodiment.

The resulting ranking values for each relevant property in a user 306's search can be stored in a database and, upon request, displayed on the user's client device. Returning to FIG. 5P, an example of such a display is shown. Therein, it can be seen that a picture of each property is displayed in order of lowest-scoring as the highest ranking value. Additionally, other information associated with the user's preferences can also be displayed to inform the user about the property's qualifications relative to the user's preferences. For example, the system 302 can superimpose the number of "must have" preferences over a corner of the picture of each property. Additionally, the system can inform the user about the actual metrics of the property relative to the user's preferences, e.g., distance to work, distance to beach, distance to daughter's school, etc. As also seen in FIG. 5P, the properties can be displayed as a ranked list. However, using the map button in the upper left hand corner of the user interface screen of FIG. 5P, the display can switch to a map view where the properties are located on the map using pin icons or the like as shown in FIG. 6A. The pins can be numbered to indicate their position in the user's ranked list. When a user selects a pinned property on his or her client device 306, the display can then overlay information about the selected property on the bottom of the display as also seen in FIG. 6A. Alternatively, the overlaid property information can be swiped in either direction such that whichever property information is currently overlaid on the map, the corresponding pin in the map can become highlighted or change color. The geospatial reference is enhanced by the products scoring to assist buyers in recognizing whether location is important in the cost value calculations. Again enhancing communications across the different components and users, collaborators and sellers, sales persons.

Figure 6B:
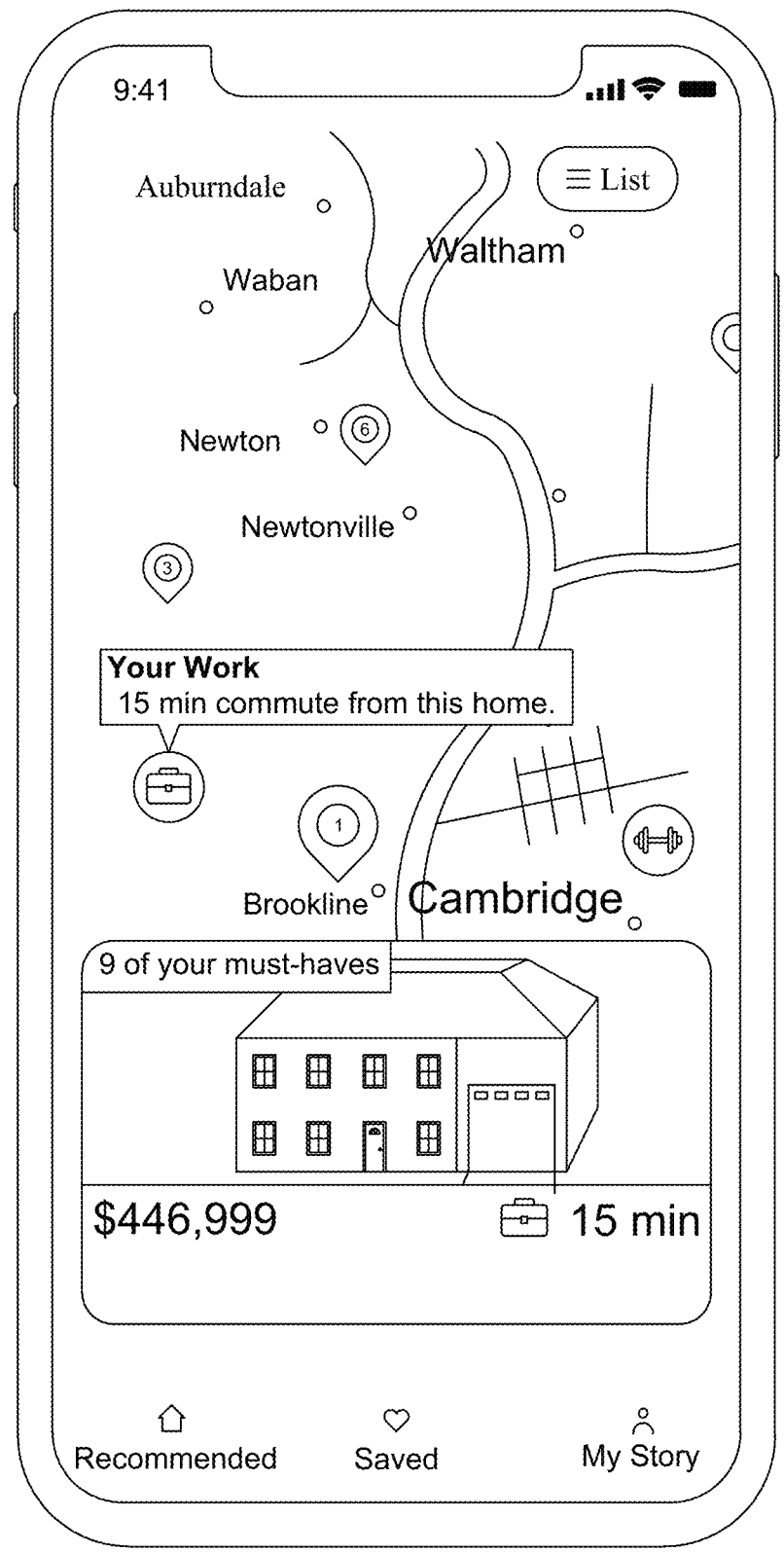

The system 302 can also display icons on the map indicating the locations of places of interest relative to the user 306's preferences. For example, in FIG. 6A the system provides icons showing the locations of the user's place of work (represented by a briefcase icon), the user's gym (represented by a barbell icon) and the user's daughters school (represented by a graduation cap icon). Scrolling over or otherwise selecting one of these preference icons can, for example, reveal a distance between that preference location and a currently selected property as shown in FIG. 6B.

According to some embodiments, using the above-described geo-location techniques to locate the user's client device 306, the system 302 can also put an icon on the display indicating the user's current location relative to the properties in his or her list. Moreover, the system 302 can also provide directions to each selected property in the list relative to the user's current location so that the user can drive by the property and inspect it visually. If a user finds, for example, a neighborhood that she or he really likes, that user can add a preference (e.g., by clicking on the "My Story" icon at the bottom of the screen) which indicates that the list can be re-ranked to emphasize, e.g., properties within 5 miles of my current location.

The above-described embodiments show how system 302 can provide a user 306 with a ranked list of goods or services which are prioritized based on the user's own personal preferences. However according to other embodiments, the ranked list can be generated also taking into account the inputs/preferences of others, who are referred to herein as "collaborators". This embodiment highlights the communications component of the collaboration which results in more effective communications related to location and parameters determined through the algorithms.

Figure 6C:
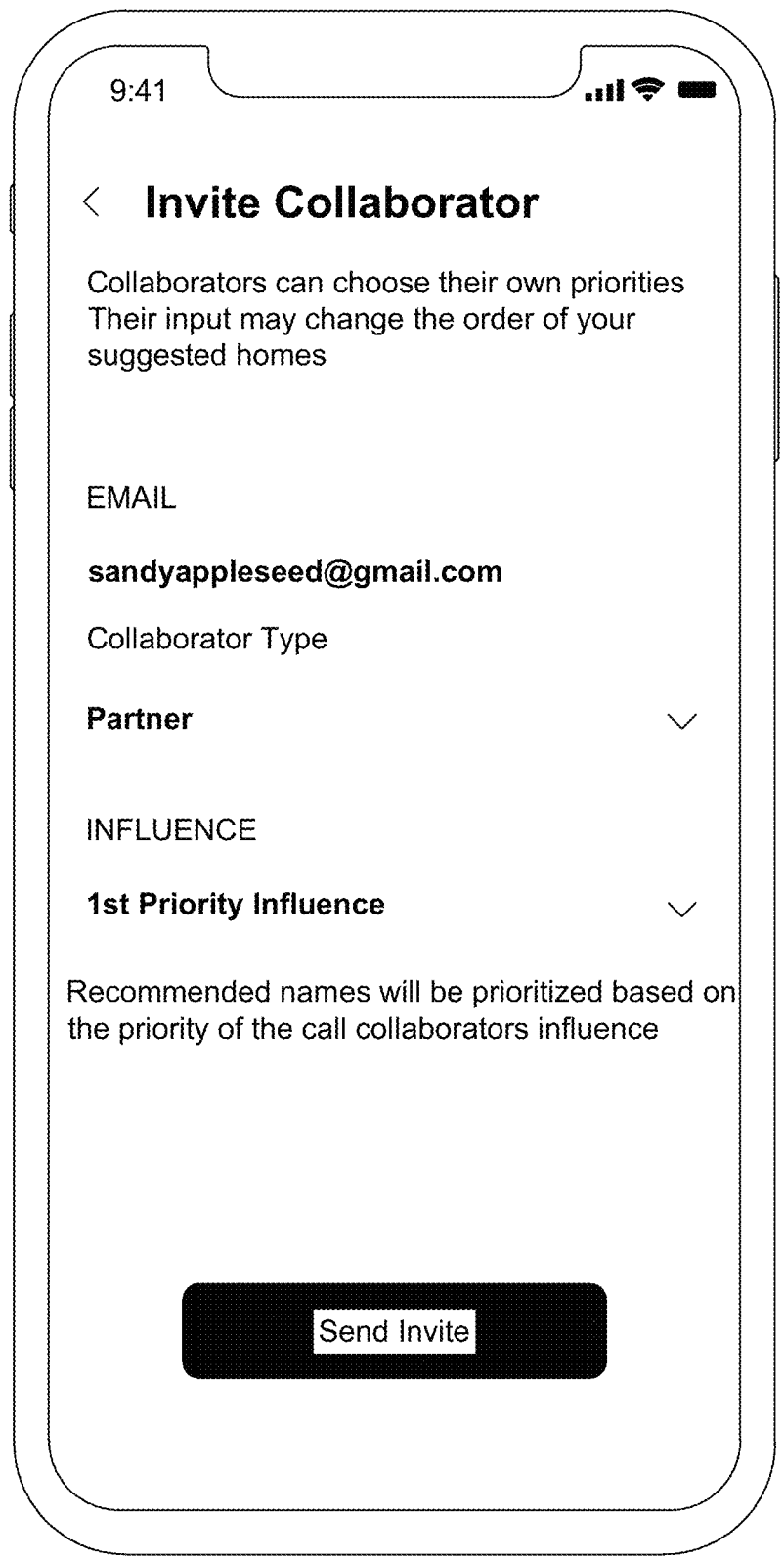
Figure 6D:
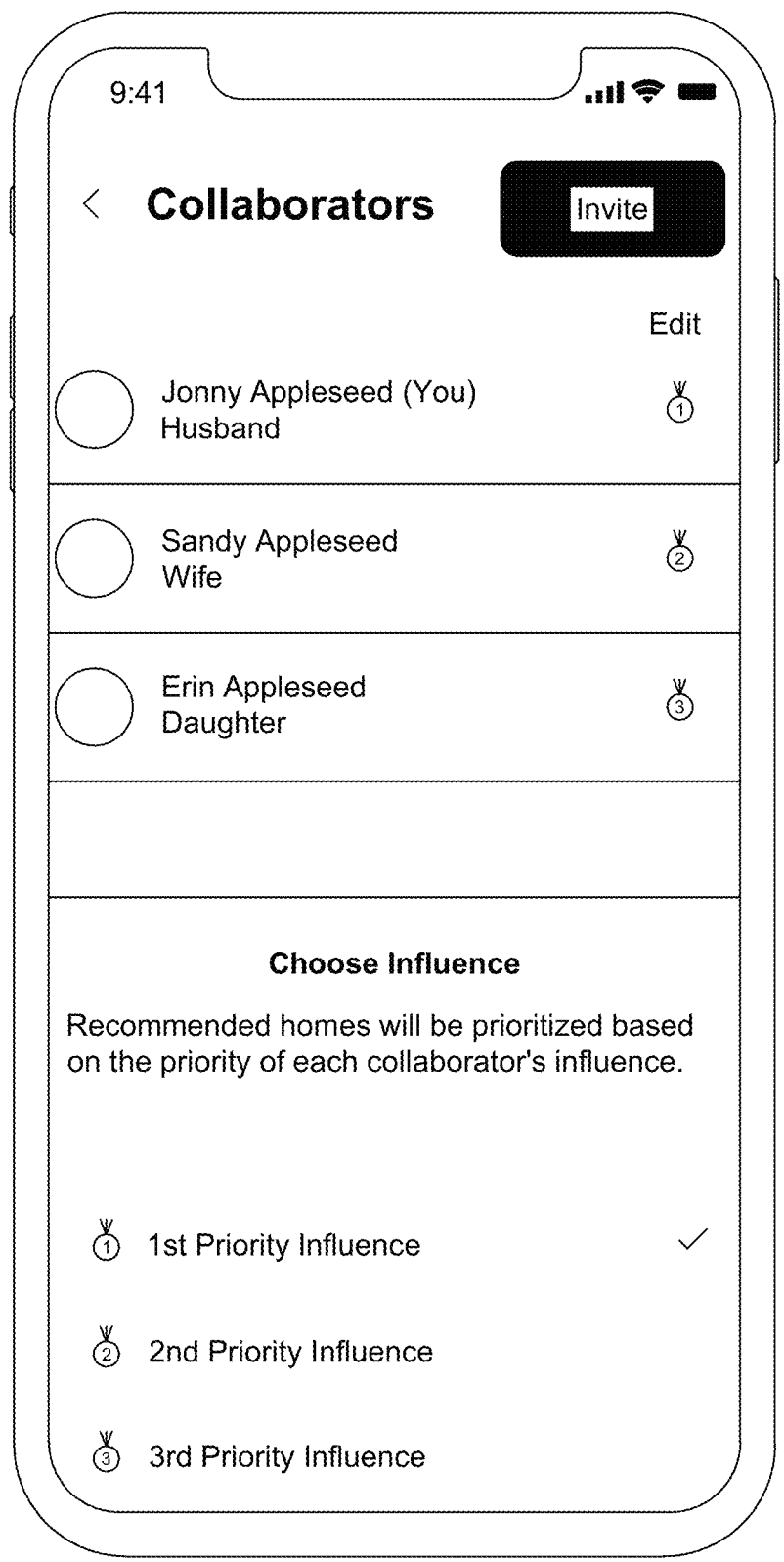
Figure 6E:
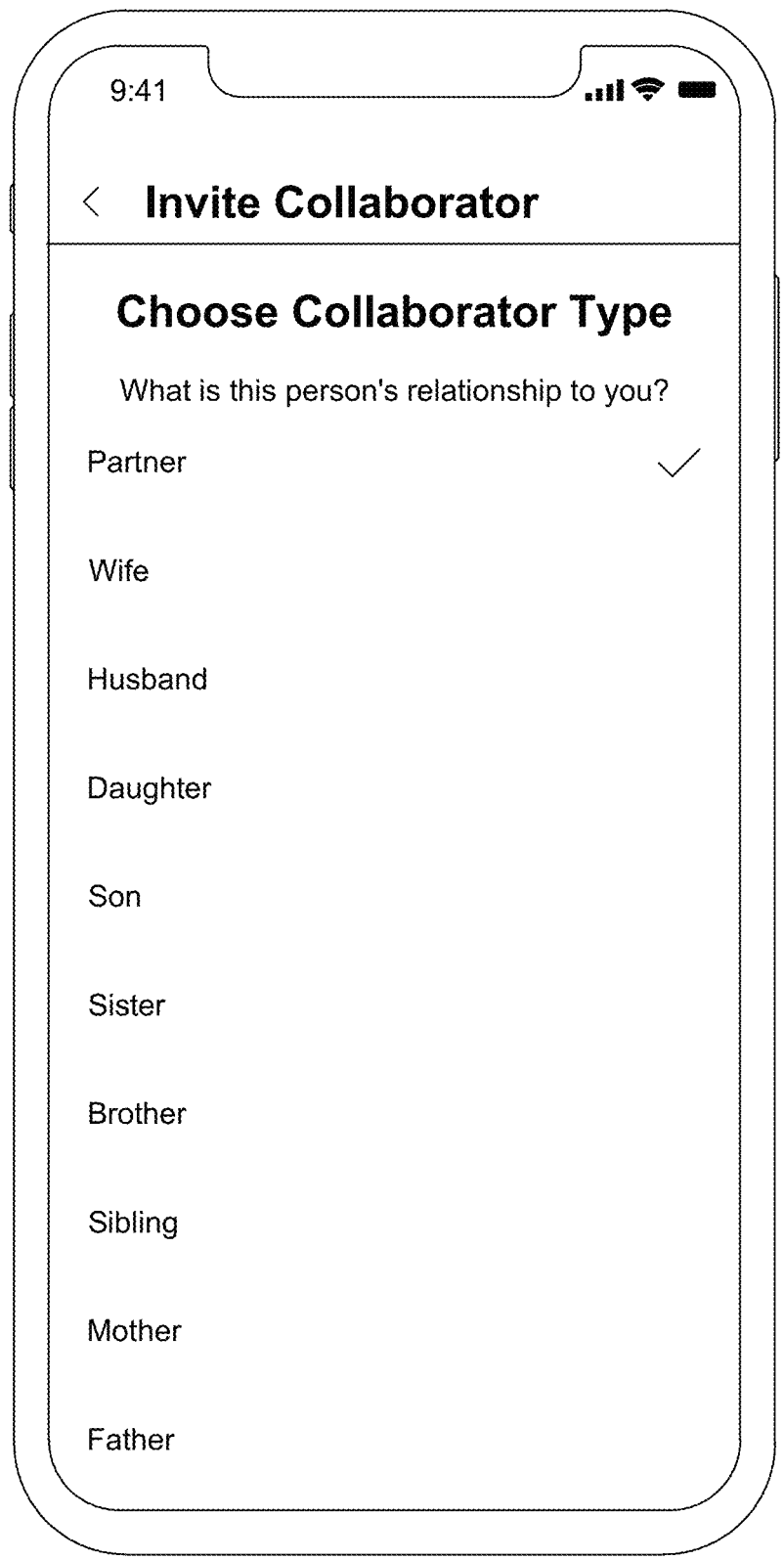

For example, FIG. 6C depicts a user interface screen that can be generated on a user's client device 306 to enable the user to invite a collaborator via email. A collaborator can have a type and an influence priority which can, for example, impact the amount of weight that is factored into the generation of the ranked list relative to the user's preferences and other collaborators. As indicated in FIG. 6C, the addition of one or more collaborators can affect the rankings of the goods or services in the list, but this can be useful when the user wants to collaborate on a purchase, e.g., buying a home with a partner or renting a home, or selecting a place to eat, or a type of vehicle to purchase. As shown in FIGS. 6D and 6E, the influence priority can take one of a plurality of different values, as can the collaborator type, respectively. The collaborator type permits a weighting of the type of collaborator, (i.e $1^{st}$ Priority Influence is equal to the primary collaborator, $2^{nd}$ Priority Influence is a 2 weight, and $3^{rd}$ is a 3 weight which influences the weight of the collaborators preferences within the algorithm.

Figure 7:
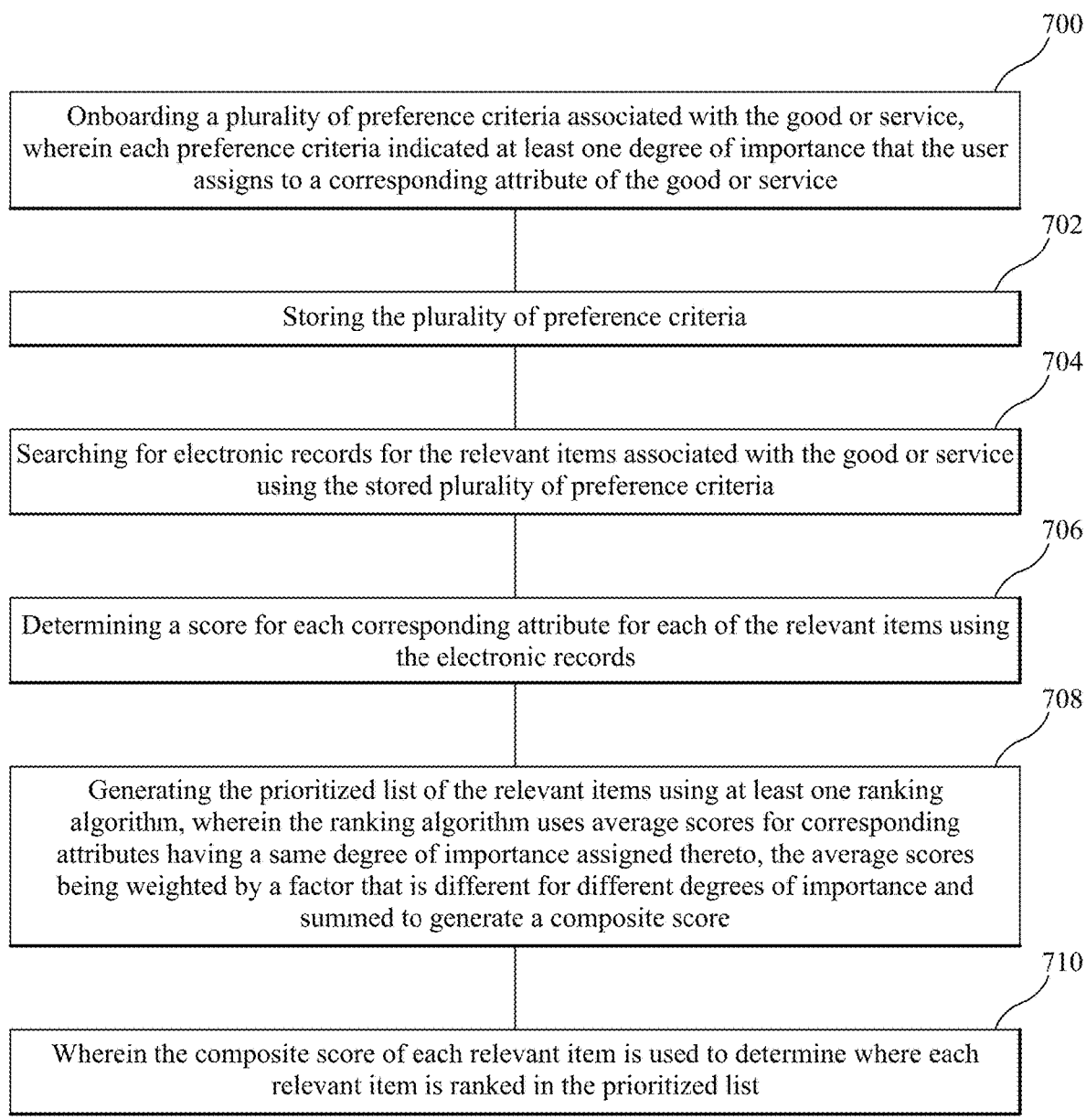
FIG. 7 is a flowchart illustrating a method according to an embodiment.
Figure 8A:
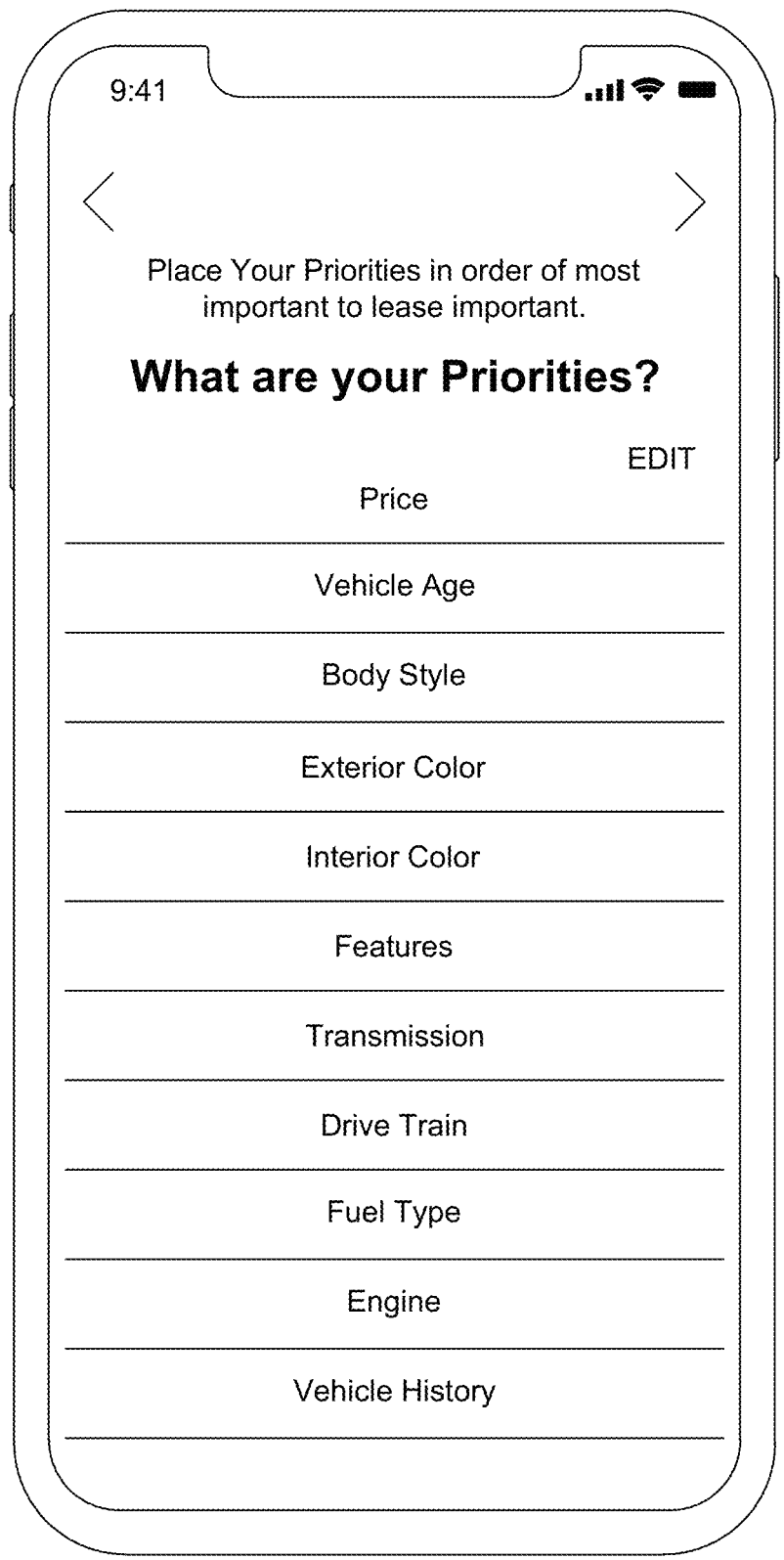
FIGS. 8(A)-8(D) depict other user interface screens associated with other embodiments.
Figure 8B:
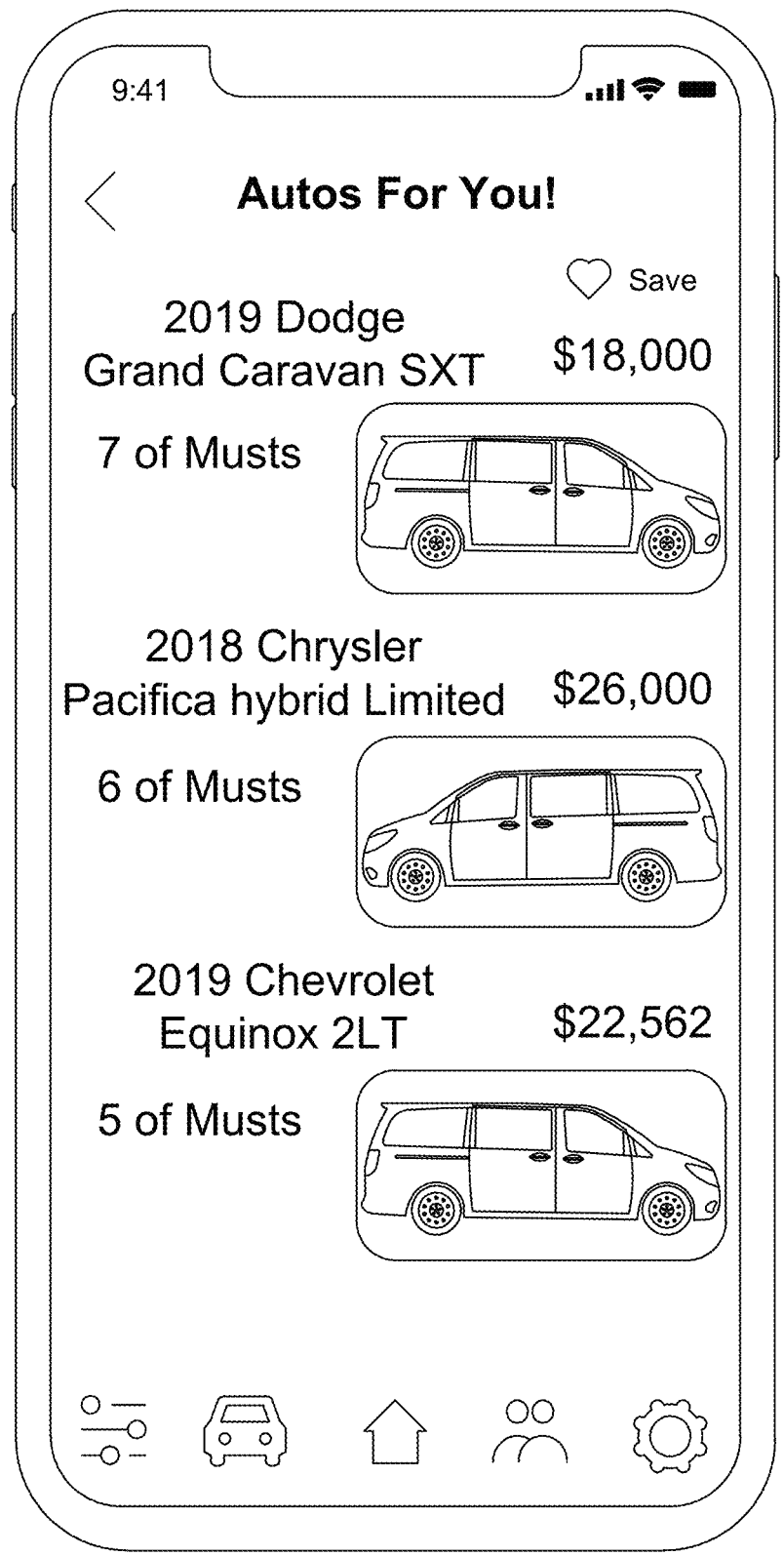
Figure 8C:
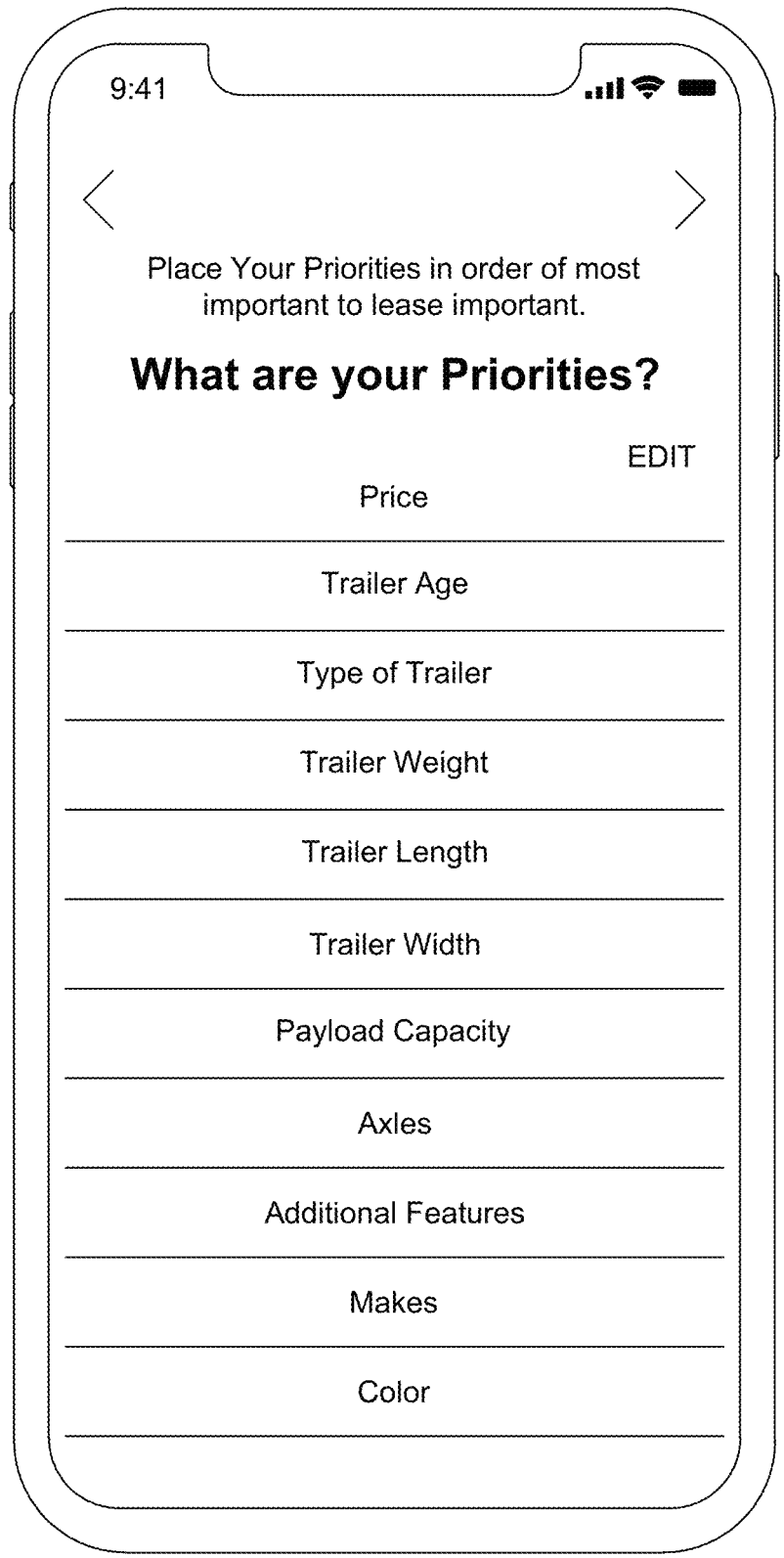
Figure 8D:
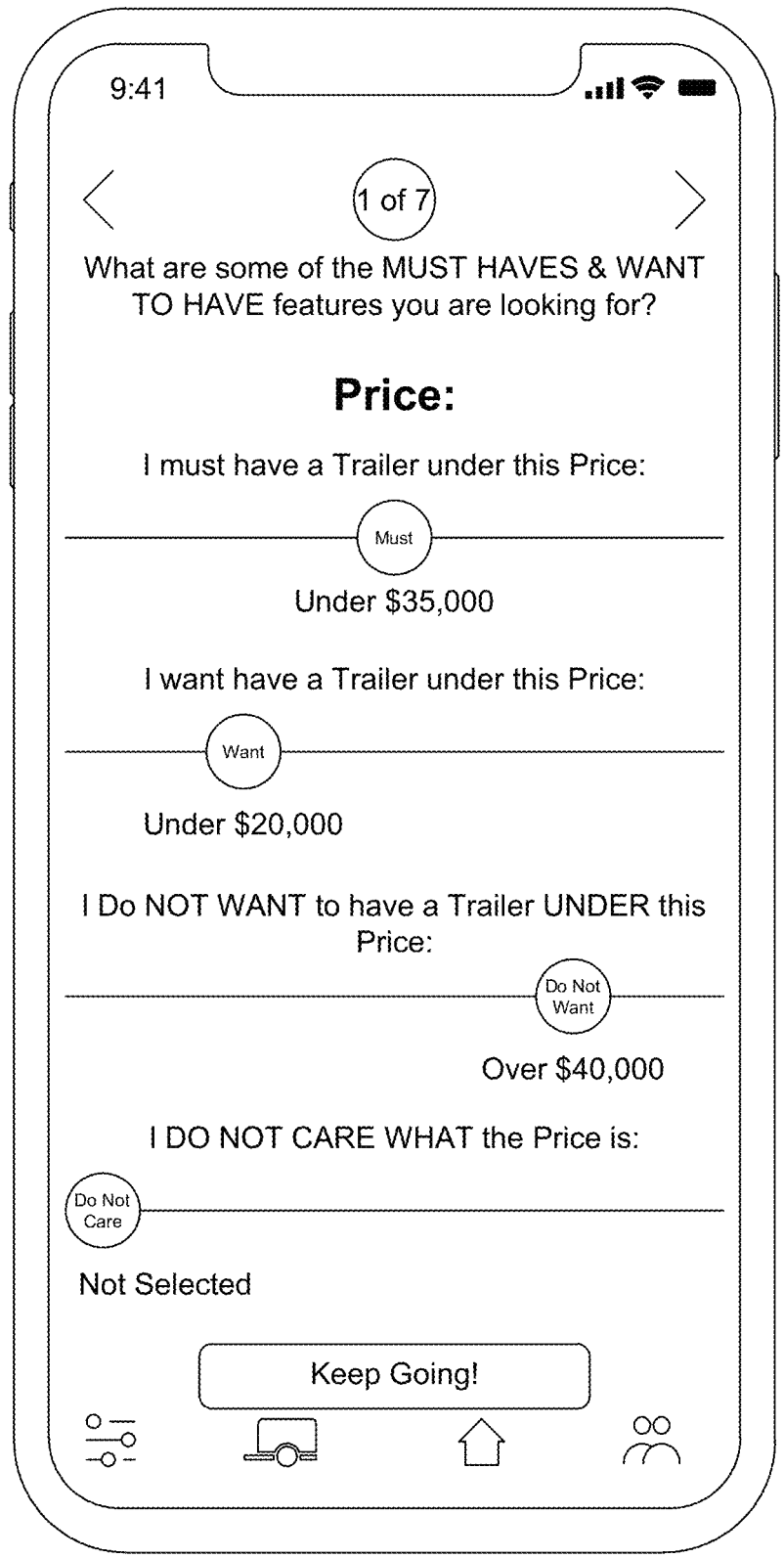

According to an embodiment a method for generating a prioritized list of relevant items associated with a good or a service is illustrated in the flowchart of FIG. 7. The method includes, at step 700, onboarding a plurality of preference criteria associated with the good or service, wherein each preference criteria indicates at least one degree of importance that the user assigns to a corresponding attribute of the good or service. Next, at step 702, storing the plurality of preference criteria and then, at step 704, searching for electronic records for the relevant items associated with the good or service using the stored plurality of preference criteria. Using this information, the method then determines a score for each corresponding attribute for each of the relevant items at step 706 and generates the prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score at step 708. The composite score of each relevant item is used to determine where each relevant item is ranked in the prioritized list at step 710.

Thus, the foregoing embodiments describe various methods and systems for presenting a prioritized listing of goods or services to prospective buyers. The process includes algorithms which leverage artificial intelligence methodology and machine learning processing to identify and enhance a user's awareness of the unique attributes of goods or services of interest. Each good or service is represented by unique attributes. The user provides physical or emotional preferences relative to those unique attributes that are cataloged and stored. The process prioritizes the goods or services also by unique attributes provided by the sellers of the goods or services to enable the system to set specific values for the respective fields of importance indicated by the user. Each field is weighted based on the user's preferences as indicated during the onboarding process. Each field is specifically assigned by the user and is discoverable through online available data: traditionally seller provided data, manufacturer provided data, third party provided data (i.e. feedback, reviews etc.), or user provided data. Additional data from user(s) provides enhanced prioritization, to include adding additional users (collaborators) to the specific user profile to cause resulting prioritization of goods or services to change due to a collaborative score. Additional changes are available through a seller's interface to cause changes in the priority, if selected. Also, additional changes can be indicated if permitted through alternate third-party input, through permissions provided by the user or seller, depending on the good or service being presented.

The foregoing embodiments focus on real estate, however the embodiments are not limited thereto. For example, these same techniques can be applied to applications for auto or trailer purchases as shown via a few exemplary screenshots in FIGS. 8A-8D. Those skilled in the art will appreciate that a complete auto purchase or trailer purchase system will have many similar features to those described above with respect to real estate systems. Tying into buyer, collaborator dealer, salesperson enhances the communications element of the aforedescribed embodiments. The ability for buyer, collaborator and sales representatives to share information enhances the communications ensuring the algorithms provide sufficient data to greatly enhance the organizational structure of the diverse product opportunities presented for the buyers. This reduces confusion concerning the diverse product opportunities which enhances the buyers experience and improves decision making.

Note that not all of the steps of the techniques described herein are necessarily performed in a single microprocessor or even in a single module.

Additionally, in some embodiments the non-limiting term client device or equipment is used and it refers to any type of wireline devices or wireless devices communicating with a network node in a cellular or mobile communication system over a radio interface. Examples of client devices or user equipments (UEs) are target devices, device to device (D2D) UEs, proximity-based service (ProSe) UEs, machine type UEs or UEs capable of machine to machine communication (aka category 0 UEs, low cost and/or low complexity UEs), PDAs, iPADs, tablets, mobile terminals, smart phones, laptop embedded equipment (LEE), laptop mounted equipment (LME), USB dongles, wireless devices etc. However such devices can also include virtual reality equipments, including VR goggles, headsets, glasses and the like.

It should be understood that this description is not intended to limit the invention. On the contrary, the embodiments are intended to cover alternatives, modifications and equivalents, which are included in the spirit and scope of the invention. Further, in the detailed description of the embodiments, numerous specific details are set forth in order to provide a comprehensive understanding of the invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A radiocommunication system comprising:
   a first wireless communication device including a first interface for entering information, by a user of the first wireless communication device, associated with a plurality of preference criteria associated with the good or service, wherein each preference criteria indicates at least one degree of importance that the user assigns to a corresponding attribute of the good or service; and
   a central server configured to store and process the plurality of preference criteria and to search for electronic records for relevant items associated with the good or service using the stored plurality of preference criteria;
   wherein the central server also determines a score for each corresponding attribute for each of the relevant items using the electronic records, and generates a prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score;
   wherein the composite score of each relevant item is used to determine where each relevant item is ranked in the prioritized list,
   wherein the central server sends the prioritized list to the first wireless communication device for display thereon,
   wherein the first wireless communication device provides a second interface for editing priorities associated with said preference criteria,
   wherein the at least one degree of importance includes a must have preference criteria and a want preference criteria,
   wherein the entering information associated with the plurality of preference criteria further comprises entering the plurality of preference criteria associated with the good or service from a primary user and entering the plurality of preference criteria associated with a same good or service from additional users comprising one or more collaborators defined by the primary user.

2. The radiocommunication system of claim 1, wherein the good or service is real estate properties for sale, the relevant items are real estate properties in a certain location, and the corresponding attributes include number of bedrooms.

3. The radiocommunication system of claim 2, wherein the plurality of preference criteria entered by the user indicates that the user must have three bedrooms, and that the user wants four bedrooms and further wherein the at least one ranking algorithm prioritizes a first relevant item in the prioritized list that has four bedrooms higher than a second relevant item that has three bedrooms if the first and second relevant items have a same score for others of the plurality of preference criteria.

4. The radiocommunication system of claim 1, wherein the ranking algorithm also uses average scores associated with the preference criteria onboarded for the one or more collaborators for corresponding attributes having a same degree of importance assigned thereto, the average scores being weighted by a factor that is different for different degrees of importance to determine where each relevant item is ranked in the prioritized list.

5. The radiocommunication system of claim 4, wherein the weights used by the ranking algorithm for the average scores generated using the corresponding attributes associated with the primary user's plurality of preference criteria are different from the weights used by the ranking algorithm for the average scores generated using the corresponding attributes associated with the one or more collaborator's plurality of preference criteria.

6. The radiocommunication system of claim 5, wherein the primary user selects a weighting level for each of the one or more collaborators.

7. The radiocommunication system of claim 1, wherein the prioritized list indicates information about each relevant item including how many of the preference criteria are satisfied by each relevant item.

8. The radiocommunication system of claim 1, wherein the radiocommunication system determines a current location of the first wireless device and sends information associated with a map display to the first wireless device and wherein the first wireless device displays the map on the first wireless device including a first icon associated with the first wireless device's current location and second icons associated with the locations of items on the prioritized list, wherein the second icons include numbers indicating rankings of the items on the prioritized list.

9. A method for generating, by a user, a prioritized list of relevant items associated with a good or a service, the method comprising:

onboarding a plurality of preference criteria associated with the good or service, wherein each preference criteria indicates at least one degree of importance that the user assigns to a corresponding attribute of the good or service;

storing the plurality of preference criteria;

searching for electronic records for the relevant items associated with the good or service using the stored plurality of preference criteria;

determining a score for each corresponding attribute for each of the relevant items using the electronic records;

generating the prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score; and editing priorities of the plurality of preference criteria;

wherein the composite score of each relevant item is used to determine where each relevant item is ranked in the prioritized list, wherein the at least one degree of importance includes a must have preference criteria and a want preference criteria, wherein the step of onboarding further comprises onboarding the plurality of preference criteria associated with the good or service from a primary user and onboarding the plurality of preference criteria associated with a same good or service from additional users comprising one or more collaborators defined by the primary user.

10. The method of claim 9, wherein the good or service is real estate properties for sale, the relevant items are real estate properties in a certain location, and the corresponding attributes include number of bedrooms.

11. The method of claim 10, wherein the plurality of preference criteria onboarded by the user indicates that the user must have three bedrooms, and that the user wants four bedrooms and further wherein at least one ranking algorithm prioritizes a first relevant item in the prioritized list that has four bedrooms higher than a second relevant item that has three bedrooms if the first and second relevant items have a same score for others of the plurality of preference criteria.

12. The method of claim 9, wherein the ranking algorithm also uses average scores associated with the preference criteria onboarded for the one or more collaborators for corresponding attributes having a same degree of importance assigned thereto, the average scores being weighted by a factor that is different for different degrees of importance to determine where each relevant item is ranked in the prioritized list.

13. The method of claim 9, wherein the weights used by the ranking algorithm for the average scores generated using the corresponding attributes associated with the primary user's plurality of preference criteria are different from the weights used by the ranking algorithm for the average scores generated using the corresponding attributes associated with the one or more collaborator's plurality of preference criteria.

14. The method of claim 13, wherein the primary user selects a weighting level for each of the one or more collaborators.

15. The method of claim 9, wherein the prioritized list indicates information about each relevant item including how many of the preference criteria are satisfied by each relevant item.

16. The method of claim 9, further comprising:

determining a current location;

sending information associated with a map display; and displaying the map including a first icon associated with the current location and second icons associated with the locations of items on the prioritized list, wherein the second icons include numbers indicating rankings of the items on the prioritized list.

17. A radiocommunication system comprising:

a first wireless communication device including a first interface for entering information, by a user of the first wireless communication device, associated with a plurality of preference criteria associated with the good or service, wherein each preference criteria indicates at least one degree of importance that the user assigns to a corresponding attribute of the good or service; and a central server configured to store and process the plurality of preference criteria and to search for electronic records for relevant items associated with the good or service using the stored plurality of preference criteria;

wherein the central server also determines a score for each corresponding attribute for each of the relevant items using the electronic records, and generates a prioritized list of the relevant items using at least one ranking algorithm, wherein the ranking algorithm uses average scores for corresponding attributes having a same degree of importance assigned thereto, the average scores being weighted by a factor that is different for different degrees of importance and summed to generate a composite score, wherein the composite score of each relevant item is used to determine where each relevant item is ranked in the prioritized list, wherein the central server sends the prioritized list to the first wireless communication device for display thereon, wherein the entering information associated with the plurality of preference criteria further comprises entering the plurality of preference criteria associated with the good or service from a primary user and entering the plurality of preference criteria associated with a same good or service from additional users comprising one or more collaborators defined by the primary user, wherein the radiocommunication system determines a current location of the first wireless device and sends information associated with a map display to the first wireless device and wherein the first wireless device displays the map on the first wireless device including a first icon associated with the first wireless device's current location and second icons associated with the locations of items on the prioritized list, wherein the second icons include numbers indicating rankings of the items on the prioritized list.

* * * * *